US010726307B2

(12) United States Patent
Cho

(10) Patent No.: US 10,726,307 B2
(45) Date of Patent: Jul. 28, 2020

(54) REAL-TIME IDENTIFICATION OF MOVING OBJECTS IN VIDEO IMAGES

(71) Applicant: AI Systems Co., Ltd., Seoul (KR)

(72) Inventor: Changwoo Cho, Seoul (KR)

(73) Assignee: AI Systems Co., Ltd., Jeonju Chollabuk-Do (KR)

( * ) Notice: Subject to any disclaimer, the term of this patent is extended or adjusted under 35 U.S.C. 154(b) by 0 days.

(21) Appl. No.: 16/024,433

(22) Filed: Jun. 29, 2018

(65) Prior Publication Data

US 2019/0005361 A1   Jan. 3, 2019

Related U.S. Application Data

(60) Provisional application No. 62/527,392, filed on Jun. 30, 2017.

(51) Int. Cl.
*G06K 9/62* (2006.01)
*G06T 7/168* (2017.01)
(Continued)

(52) U.S. Cl.
CPC ....... *G06K 9/6277* (2013.01); *G06K 9/00664* (2013.01); *G06K 9/6202* (2013.01);
(Continued)

(58) Field of Classification Search
CPC .......... G06T 7/168; G06T 7/13; G06T 7/174; G06T 5/002; G06T 5/50; G06T 7/20;
(Continued)

(56) References Cited

U.S. PATENT DOCUMENTS 8,041,116 B2   10/2011 Eaton et al.
9,626,766 B2   4/2017 Criminisi et al.
(Continued)

FOREIGN PATENT DOCUMENTS

JP   2016-115348 A   6/2016
WO   WO 2015-147764 A1   10/2015

OTHER PUBLICATIONS

Geitgey, Machine Learning is Fun! Part 3: Deep Learning and Convolutional Neural Networks. https://medium.com/@ageitgey/machine-learning-is-fun-part-3-deep-learning-and-convolutional-neural-networks-f40359318721, accessed Jun. 6, 2017.
(Continued)

*Primary Examiner* — Hee-Yong Kim
(74) *Attorney, Agent, or Firm* — Knobbe, Martens, Olson & Bear, LLP

(57) ABSTRACT

The disclosed technology generally relates to detecting and identifying objects in digital images, and more particularly to detecting, identifying and/or tracking moving objects in video images using an artificial intelligence neural network configured for deep learning. In one aspect, a method comprises capturing a video input from a scene comprising one or more candidate moving objects using a video image-capturing device, where the video input comprises at least two temporally spaced image frames captured from the scene. The method additionally includes transforming the video input into one or more image pattern layers, where each of the image pattern layers comprises a pattern representing one of the candidate moving objects. The method additionally includes determining a probability of match between each of the image pattern layers and a stored image in a big data library. The method additionally includes adding one or more image pattern layers having the probability of match that exceeds a predetermined level to the big data library automatically, and outputting the probability of match to a user.

23 Claims, 27 Drawing Sheets

(51) Int. Cl.
  *G06T 7/13* (2017.01)
  *G06T 5/00* (2006.01)
  *G06T 5/50* (2006.01)
  *G06T 7/174* (2017.01)
  *G06T 7/20* (2017.01)
  *G06K 9/00* (2006.01)
  *G06K 9/32* (2006.01)

(52) U.S. Cl.
  CPC .......... *G06K 9/6262* (2013.01); *G06K 9/6274* (2013.01); *G06T 5/002* (2013.01); *G06T 5/50* (2013.01); *G06T 7/13* (2017.01); *G06T 7/168* (2017.01); *G06T 7/174* (2017.01); *G06T 7/20* (2013.01); *G06K 9/3216* (2013.01); *G06K 2009/6213* (2013.01); *G06K 2209/21* (2013.01); *G06T 2207/10016* (2013.01); *G06T 2207/20076* (2013.01); *G06T 2207/20081* (2013.01); *G06T 2207/20084* (2013.01)

(58) Field of Classification Search
  CPC ............. G06K 9/00664; G06K 9/6202; G06K 9/6262; G06K 9/6274
  USPC ........................................................ 348/169
  See application file for complete search history.

(56) References Cited

U.S. PATENT DOCUMENTS

| | | | |
|---|---|---|---|
| 2006/0155661 A1* | 7/2006 | Morgan | G16H 50/20 706/18 |
| 2006/0268980 A1 | 11/2006 | Le Dinh et al. | |
| 2010/0054533 A1 | 3/2010 | Steinberg et al. | |
| 2014/0355861 A1 | 12/2014 | Nirenberg et al. | |
| 2015/0104062 A1* | 4/2015 | Huang | G06T 7/194 382/103 |
| 2015/0324655 A1 | 11/2015 | Chalasani et al. | |
| 2016/0180195 A1 | 6/2016 | Martinson et al. | |
| 2016/0350914 A1 | 12/2016 | Champlin et al. | |
| 2016/0358035 A1 | 12/2016 | Ruan et al. | |
| 2016/0377529 A1 | 12/2016 | Retterath et al. | |
| 2017/0083762 A1 | 3/2017 | Segalovitz et al. | |
| 2017/0140236 A1 | 5/2017 | Price et al. | |

OTHER PUBLICATIONS

Yu et al., Deep Learning and Its Application to Signal and Information Processing [exploratory Dsp], IEEE Signal Processing Magazine, Jan. 1, 2011, vol. 28, Issue 1.

* cited by examiner

Object Extraction ⇨ Compares the last photographed image with the two newly photographed images, and extracts the range where the RGB values have changed

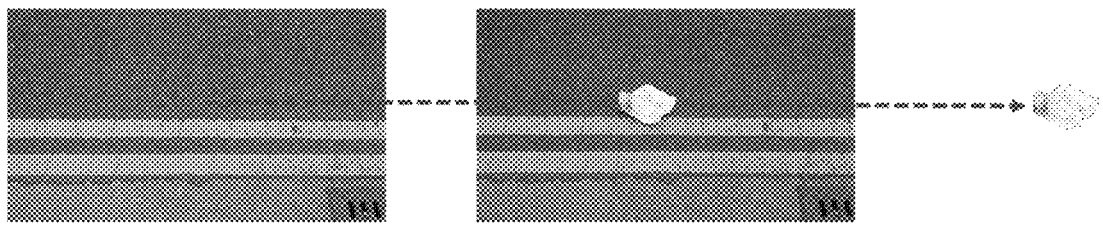

If a new object appears in the existing space ⇨ Extract newly appeared objects
(Extracting the range of pixels in which the RGB value is finally changed in the digital image)

FIG. 3A

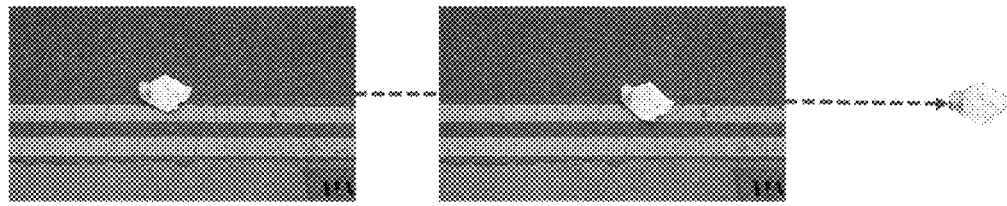

When the movement of the object occurs, Extract the object in the photograph that was taken later
(Extracting the range of pixels in which the RGB value has changed finally in the digital image)

FIG. 3B

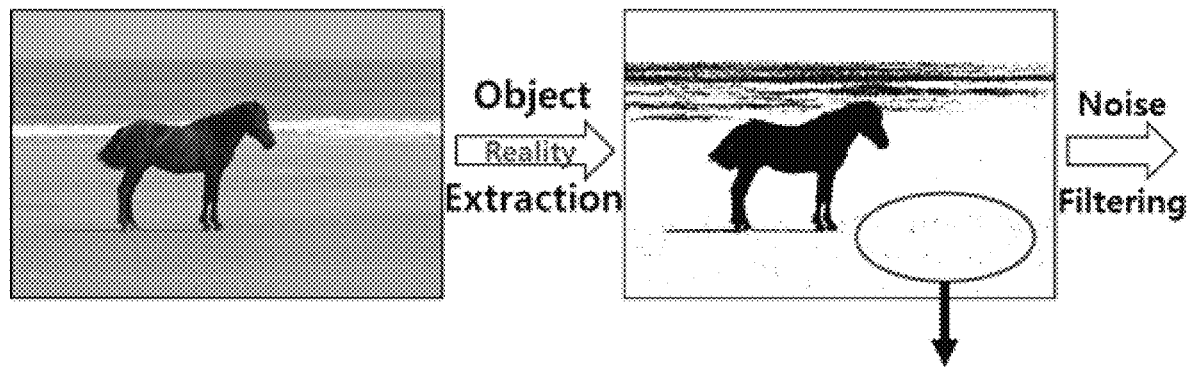
Noise (Moving objects that are too small to be analyzed)
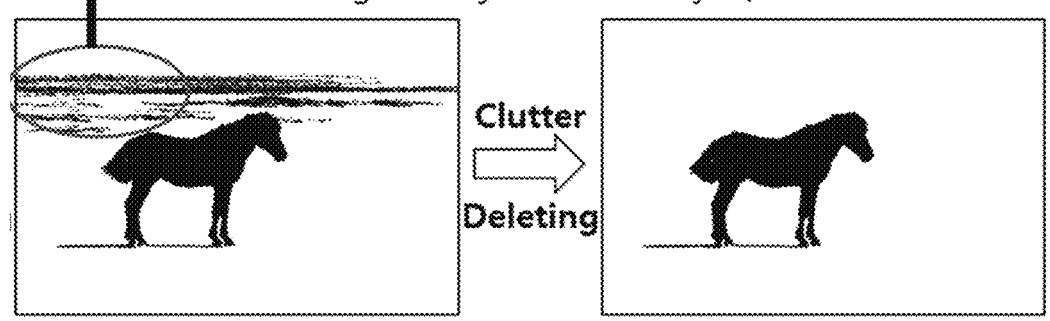
FIG. 4

REAL-TIME IDENTIFICATION OF MOVING OBJECTS IN VIDEO IMAGES

CROSS-REFERENCE TO RELATED APPLICATIONS

This application claims the benefit of priority to U.S. Provisional Patent Application No. 62/527,392, filed Jun. 30, 2017, entitled "REAL-TIME IDENTIFICATION OF MOVING OBJECTS IN VIDEO IMAGES," the content of which is hereby incorporated by reference herein in its entirety.

BACKGROUND

Field

The disclosed technology generally relates to detecting and identifying objects in digital images, and more particularly to detecting, identifying and/or tracking moving objects in video images using an artificial intelligence neural network configured for deep learning.

Description of the Related Technologies

Recent advances in image processing technologies and machine learning algorithms have resulted in an unprecedented development in artificial intelligence-based information extraction capabilities from digital visual media. One area of artificial intelligence-based information extraction that has attracted particularly high interest is object detection and identification, e.g., facial recognition. However, advances in artificial intelligence-based object detection and identification have been limited to non-moving objects, e.g., object detection and identification based on non-video or still mages. In addition, advances in artificial intelligence-based object detection and identification have relied on high computing power and stored data, often requiring communication, often not real-time, with a powerful server for computing and/or storage of information. However, there is a growing need for object detection and identification of moving objects in video images that uses compact algorithms and hardware for use in real-time applications. Thus, embodiments disclosed herein address the need for hardware and algorithm for detecting, identifying and/or tracking moving objects real-time in video images using an artificial intelligence neural network configured for deep learning.

SUMMARY OF CERTAIN INVENTIVE ASPECTS

In one aspect, a method implemented on an electronic device for identifying a moving object in a video image using an artificial intelligence neural network configured for deep learning comprises capturing a video input from a scene comprising one or more candidate moving objects using a video image-capturing device, where the video input comprises at least two temporally spaced image frames captured from the scene. The method additionally includes transforming the video input into one or more image pattern layers, where each of the image pattern layers comprises a pattern representing one of the candidate moving objects. The method additionally includes determining a probability of match between each of the image pattern layers and a stored image in a big data library. The method additionally includes adding one or more image pattern layers having the probability of match that exceeds a predetermined level to the big data library automatically, and outputting the probability of match to a user.

In another aspect, an electronic device configured to identify a moving object in a video image using an artificial intelligence neural network configured for deep learning comprises a video capturing module configured to capture a video input from a scene comprising one or more candidate moving objects using a video image-capturing device, where the video input comprising at least two temporally spaced image frames captured from the scene. The electronic device additionally comprises an embedded software comprising a transformation module configured to transform the video input into one or more image pattern layers, wherein each of the image pattern layers comprises a pattern representing one of the candidate moving objects, and a probability determination module configured to determine a probability of match between each of the image pattern layers and a stored image in a big data library. The electronic device additionally includes a big data library comprising a plurality of stored images, wherein the embedded software is configured to add one or more image pattern layers having the probability of match that exceeds a predetermined level to the big data library automatically. The electronic device further comprises an output device configured to output the probability of match to a user.

In another aspect, a computer-readable medium comprises instructions that when executed cause a processor to perform the following steps: capturing a video input from a scene comprising one or more candidate moving objects using a video image-capturing device, the video input comprising at least two temporally spaced image frames captured from the scene; transforming the video input into one or more image pattern layers, wherein each of the image pattern layers comprises a pattern representing one of the candidate moving objects; determining a probability of match between each of the image pattern layers and a stored image in a big data library; adding one or more image pattern layers having the probability of match that exceeds a predetermined level to the big data library automatically; and outputting the probability of match to a user.

In another aspect, a method of identifying a moving object in one or more image frames of a video image uses an artificial intelligence neural network configured for deep learning. The method includes receiving an input image data from a video image-capturing device, the input image data comprising at least two image frames captured from a scene; identifying one or more candidate moving objects in the scene based on whether a change in RGB values has occurred in pixels associated with the one or more candidate moving objects between two of the at least two image frames; creating a plurality of image layers corresponding to each of the at least two image frames having the one or more identified candidate moving objects, wherein each of the image layers comprises an extracted image portion which includes the pixels associated with the one or more candidate moving objects; creating a set of noise-filtered image layers from the plurality of image layers, wherein each noise-filtered image layer of the set of noise-filtered image layers includes one or more moving candidate having greater than a predetermined minimum number of pixels; transforming the set of noise-filtered image layers into a set of gray scale image layers; transforming each image layer of the set of gray scale image layers into one or more image pattern layers, wherein each of the one or more image pattern layers comprises a pattern representing one of the one or more candidate moving objects; determining a probability of match between pixels of each of the one or more image pattern layers and pixels of a stored image, wherein the stored image is one of a plurality of stored images in a big data library; and adding one or more image pattern layers having the probability of match that exceeds a predetermined level of match to the big data library; and outputting the probability of match to a user.

BRIEF DESCRIPTION OF THE DRAWINGS

FIGS. 3A and 3B illustrate an example implementation of the process of extracting one or more candidate objects.

FIG. 4 illustrates noise filtering and clutter deletion, according to embodiments.

DETAILED DESCRIPTION

Figure 1:
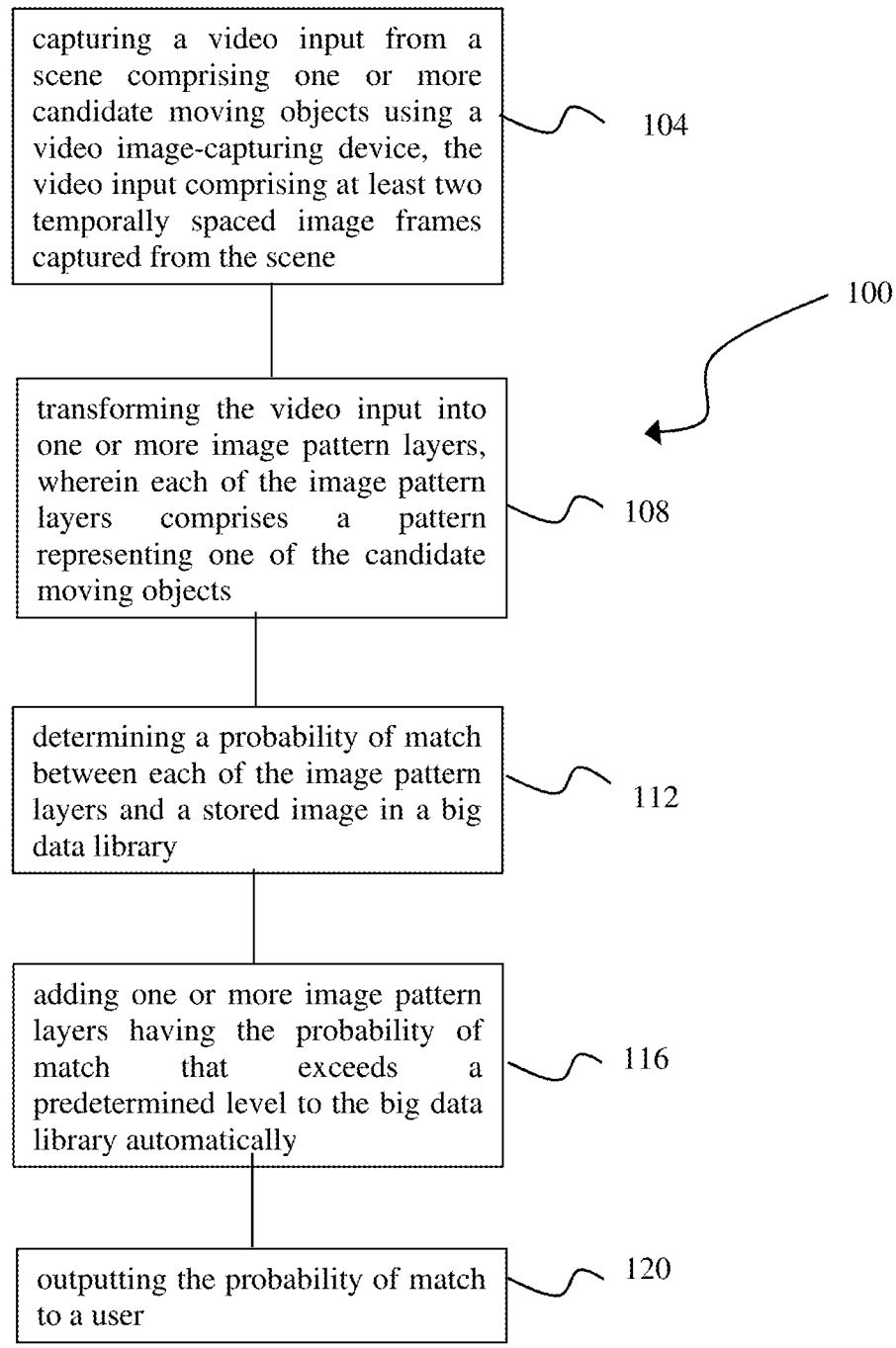
FIG. 1 is a flow chart illustrating a method implemented on an electronic device for identifying a moving object in a video image using an artificial intelligence neural network configured for deep learning, according to some embodiments.

Reference will now be made to the drawings, in which like reference numerals refer to like parts throughout. Unless indicated otherwise, the drawings are schematic not necessarily drawn to scale.

FIG. 1 is a flow chart 100 illustrating a method 100 implemented on an electronic device for identifying a moving object in a video image using an artificial intelligence neural network configured for deep learning. The method 100 comprises capturing 104 a video input from a scene comprising one or more candidate moving objects using a video image-capturing device, where the video input comprises at least two temporally spaced image frames captured from the scene. The method additionally includes transforming 108 the video input into one or more image pattern layers, where each of the image pattern layers comprises a pattern representing one of the candidate moving objects. The method additionally includes determining 112 a probability of match between each of the image pattern layers and a stored image in a big data library. The method additionally includes adding 116 one or more image pattern layers having the probability of match that exceeds a predetermined level to the big data library automatically. The method further includes outputting 120 the probability of match to a user.

Figure 1A:
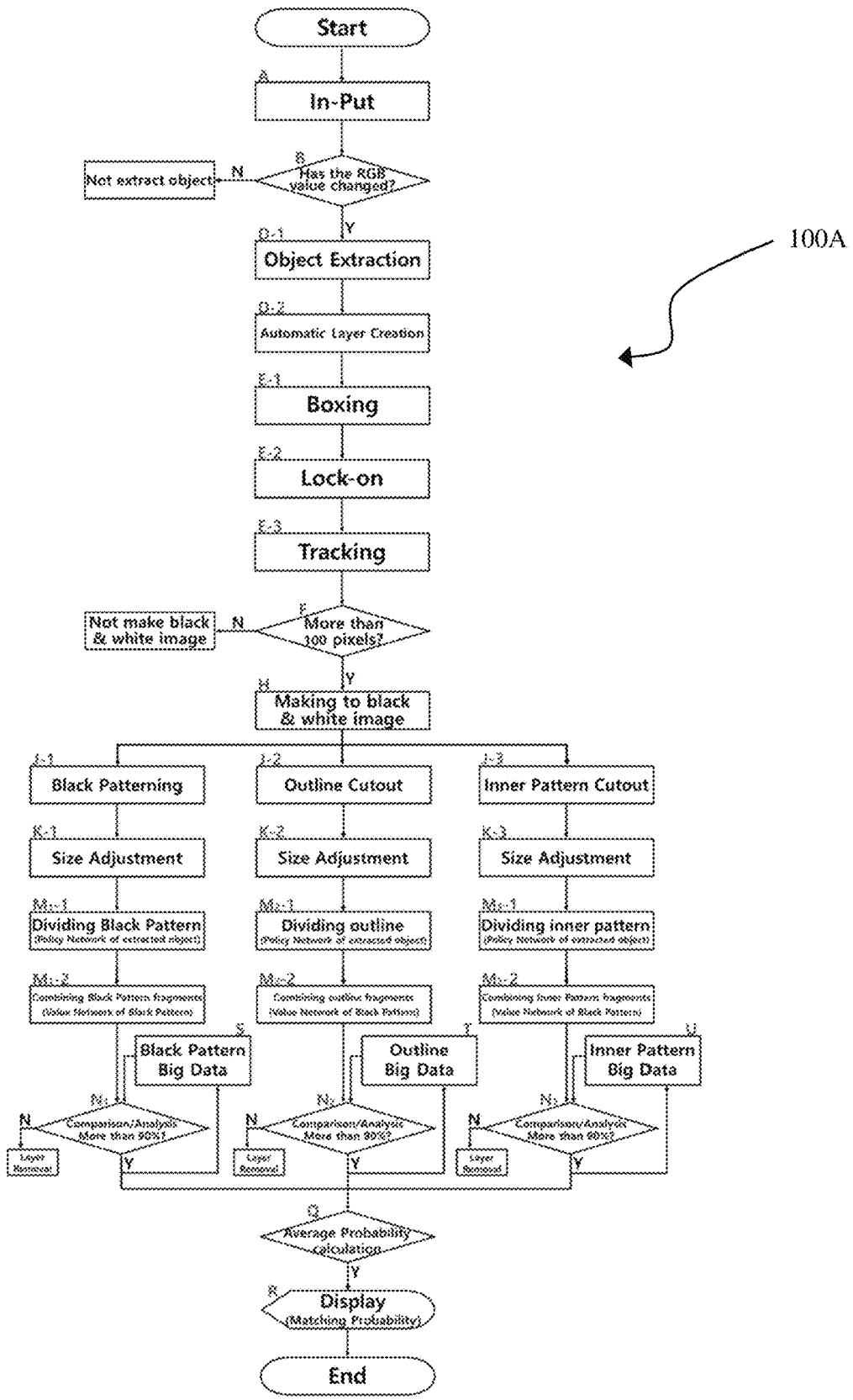
FIG. 1A is a flow chart illustrating a method implemented on an electronic device for identifying a moving object in a video image using an artificial intelligence neural network configured for deep learning, according to some other embodiments.
Figure 1B:
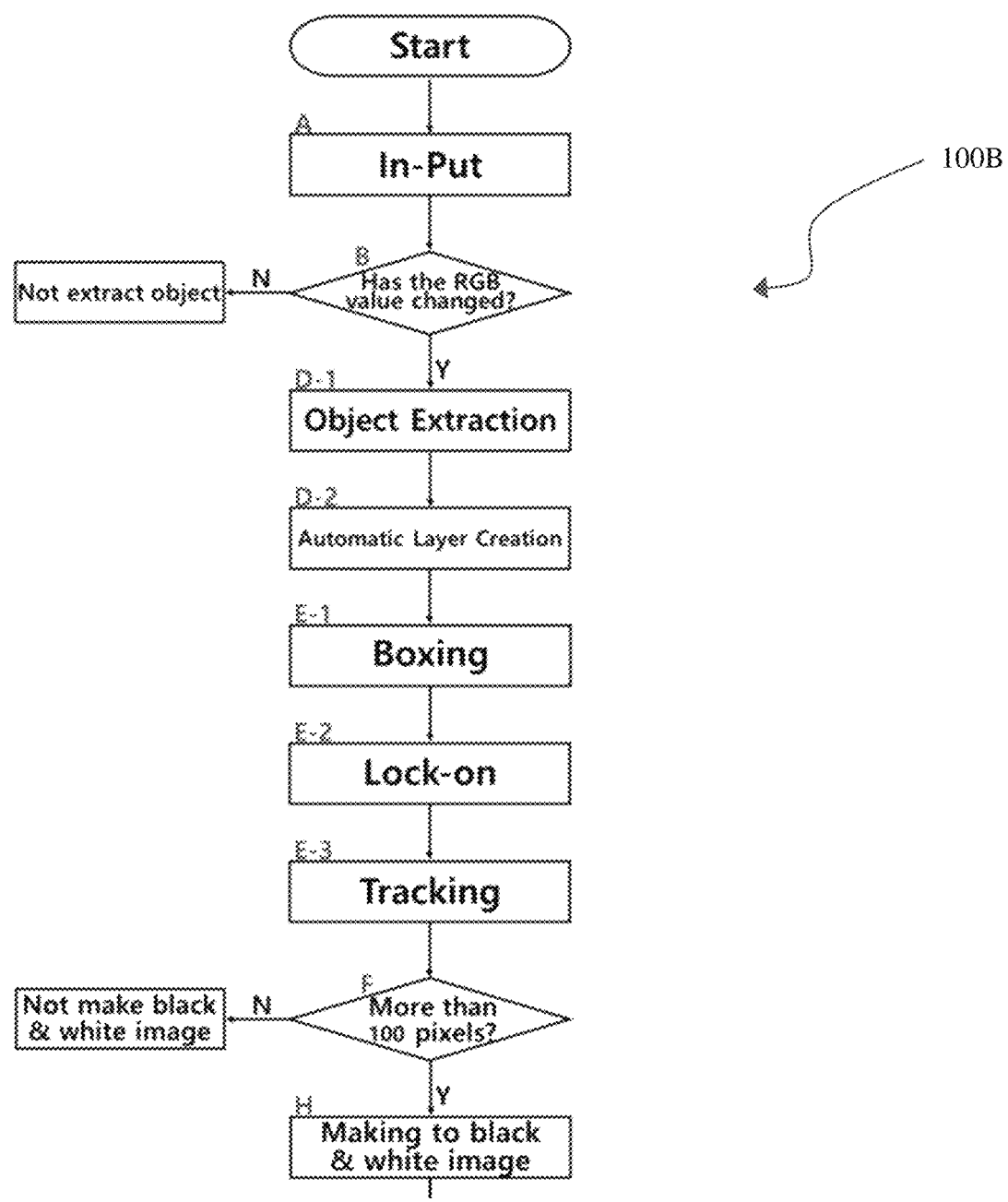
FIG. 1B is a portion of the flow chart illustrated in FIG. 1A.
Figure 1C:
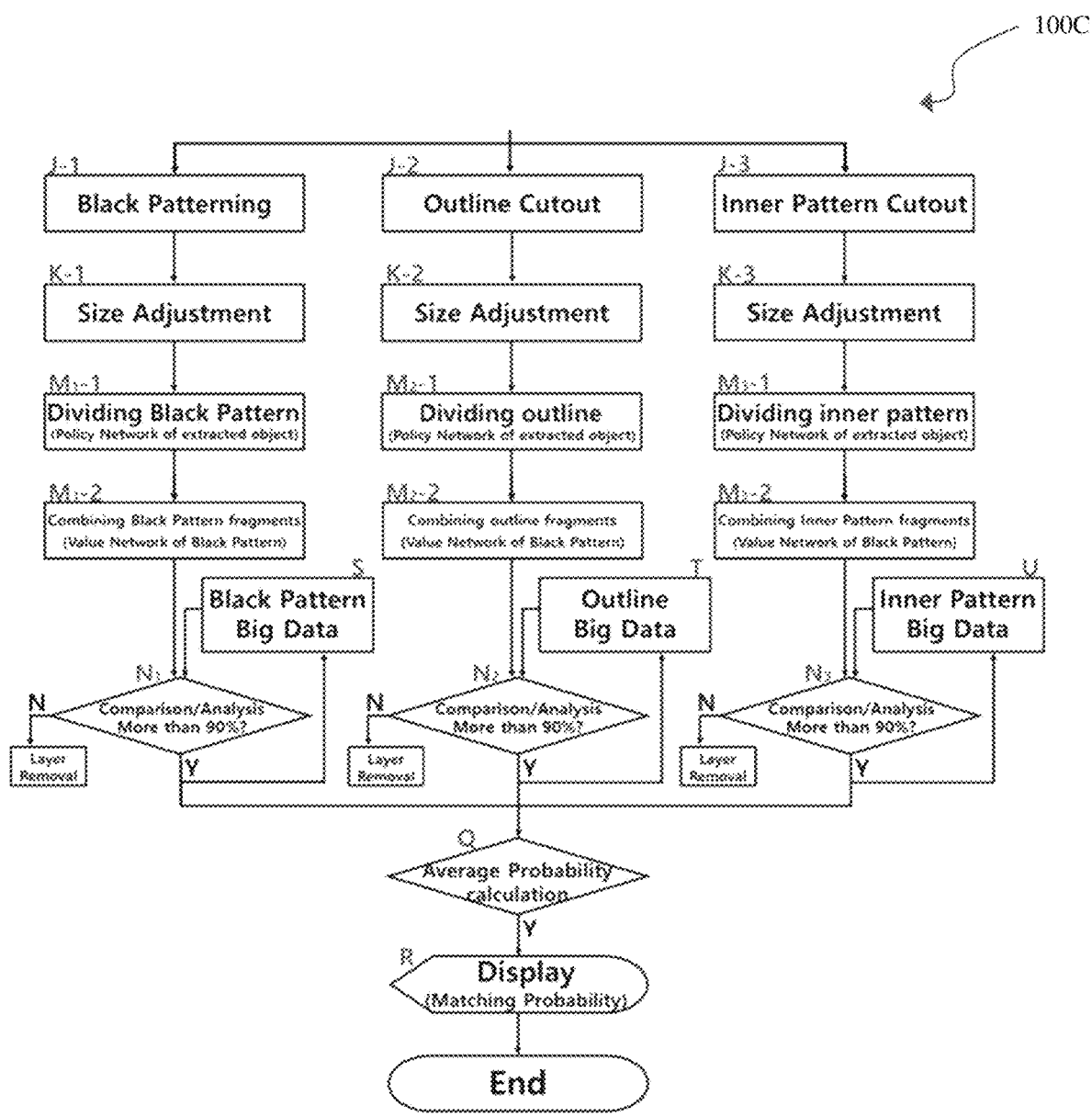
FIG. 1C is a portion of the flow chart illustrated in FIG. 1A.
Figure 1D:
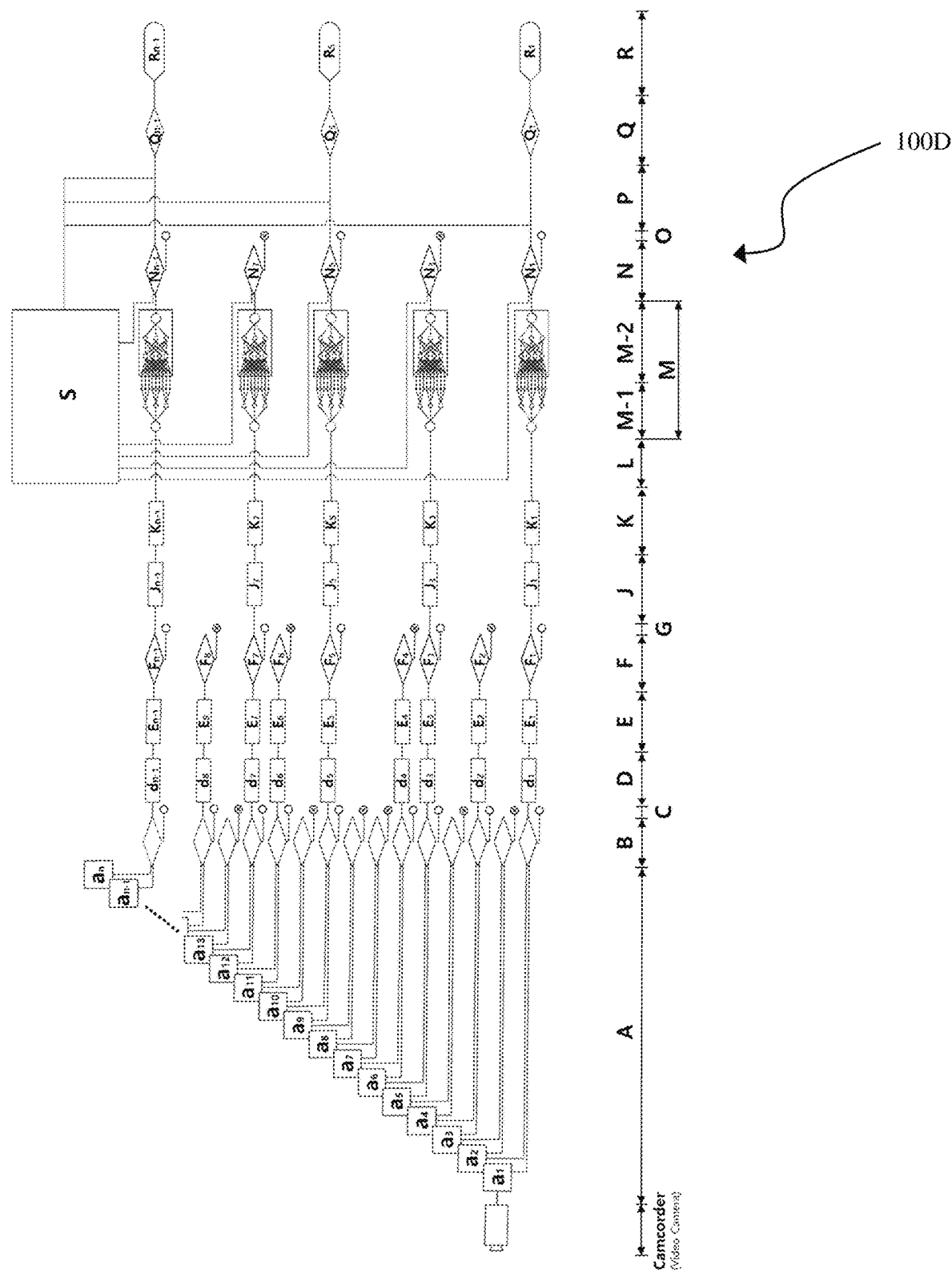
FIG. 1D is a neural network implemented on an electronic device for identifying a moving object in a video image using an artificial intelligence neural network configured for deep learning, according to some embodiments.
Figure 1E:
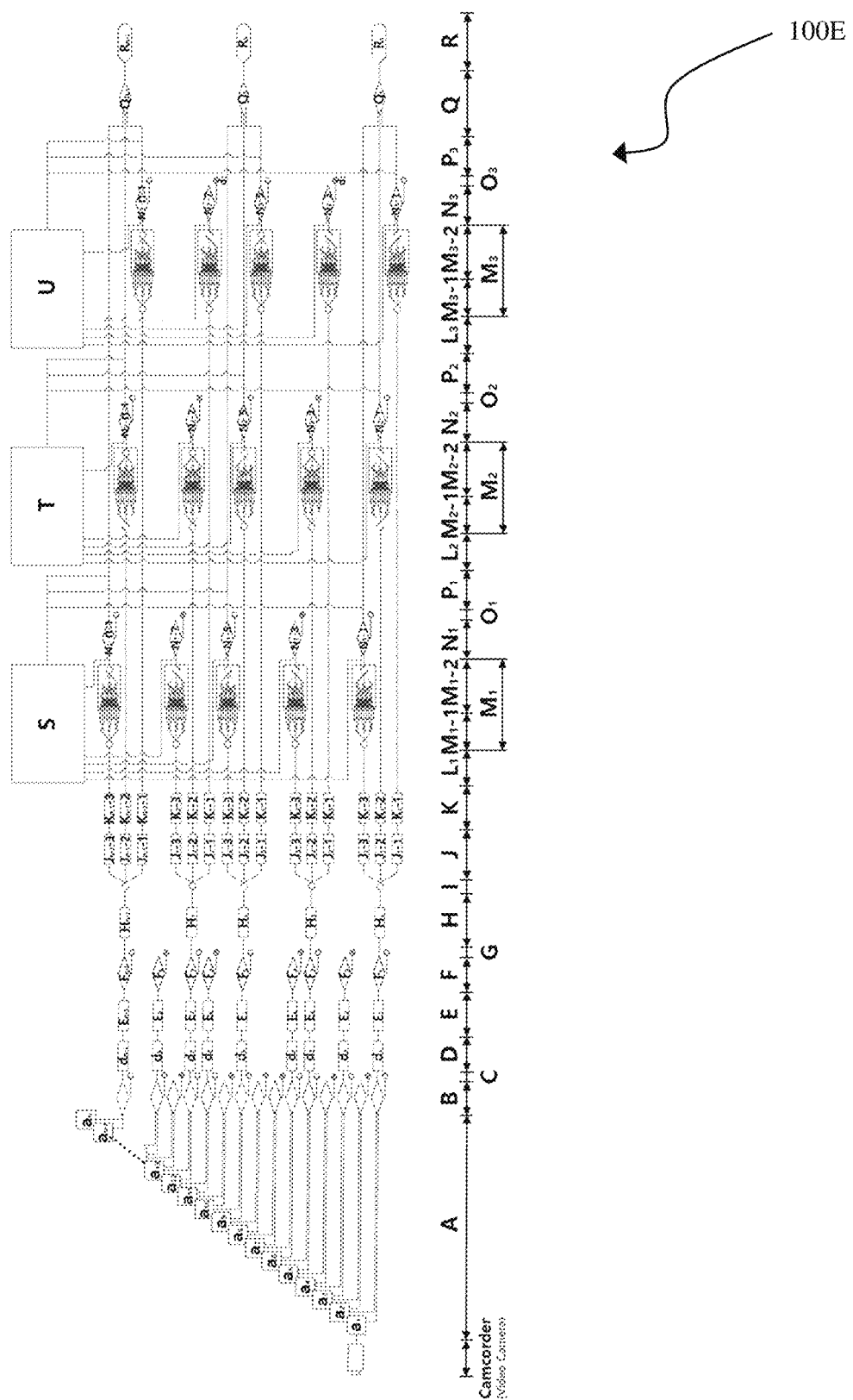
FIG. 1E is a neural network implemented on an electronic device for identifying a moving object in a video image using an artificial intelligence neural network configured for deep learning, according to some other embodiments.

FIG. 1A is a flow chart 100A illustrating a method of identifying a moving object in a video image using an artificial intelligence neural network configured for deep learning, according to some other embodiments. For clarity, FIGS. 1B and 1C illustrate flow charts 100B and 100C that are close up views of first and second portions of the flow chart 100A. FIGS. 1D and 1E are alternative embodiments of a neural network configured to perform the method illustrated with respect to FIGS. 1A-1C. In the following, the overall method and neural networks according to embodiments are described first with respect to FIGS. 1A-1E, followed by detailed description of each of the processes and layers therein.

Referring to the flow charts 100A and 100B, upon starting, the method comprises receiving at a process 100-A an input image data from a video image-capturing device. According to embodiments, the input image data is a video image data comprising at least two image frames that are temporally separated but captured from the same scene. After receiving the input image data, the method proceeds to a decision process 100-B for identifying one or more candidate moving objects in the scene based on whether a change in RGB values has occurred in pixels associated with the one or more candidate moving objects between two of the at least two image frames. If, at the decision process 100-B, a determination is made that a change in red-green-blue (RGB) values has not occurred, the method ends. If, on the other hand, at the decision process 100-B a determination is made that a change in RGB values has occurred, the method proceeds to processes 100-D-1 and 100-D-2 for extracting the one or more candidate objects. The process 100-D-1 includes extracting an image portion which includes the pixels associated with the one or more candidate moving objects. The process 100-D-2 includes creating a plurality of image layers corresponding to each of the at least two image frames having the one or more identified candidate moving objects, wherein each of the image layers comprises the extracted image portion which includes the pixels associated with the one or more candidate moving objects. The object extraction and layer creation in processes 100-D-1, 100-D-2, proceeds automatically upon determining that the RGB values have changed in the decision process 100-B. Subsequently, the method proceeds to optional processes 100-E-1, 100-E-2 and 100-E-3 of boxing, locking-on and tracking, respectively. Subsequently, at a decision process 100-E, a decision is made as to whether the layers created in processes 100-D-1, 100-D-2 include greater than a predetermined minimum number of pixels. Upon determining that the layers created in processes 100-D-1, 1-D-2 do not exceed the predetermined minimum number of pixels, the method does not proceed. On the other hand, upon determining that the layers created in processes 100-D-1, 1-D-2 do exceed the predetermined minimum number of pixels, the method proceeds to a process 100-H for creating a set of noise-filtered image layers from the plurality of image layers created in processes 100-D-1, 100-D-2, wherein each noise-filtered image layer includes greater than the predetermined minimum number of pixels. The process 100-H includes transforming the set of noise-filtered image layers into a set of gray scale image layers.

Referring to the flow charts 100A and 100C, after completion of the process 100-H, the method proceeds to transforming at a processes 100-J-1 and/or transforming at a process 100-J-2 and/or transforming at a process 100-J-3, in which each image layer of the set of gray scale image layers are transformed into one or more image pattern layers, wherein each of the one or more image pattern layers comprises a pattern representing one of the one or more candidate moving objects. At the process 100-J-1, transforming into one or more image pattern layers comprises transforming into a black pattern layer comprising a solid-filled pattern representing the one or the one or more candidate moving objects. At the process 100-J-2, transforming into one or more image pattern layers comprises transforming into an outline pattern layer comprising a contiguous outer outline representing the one or more candidate moving objects. At the processes 100-J-3 transforming into one or more image pattern layers comprises transforming into an inner pattern layer comprising patterns inside an outer outline representing the one or more candidate moving objects.

Still referring to the flow charts 100A and 100C, the process 100-J-1 of transforming into a black pattern layer is followed by a process 100-K-1 for adjusting the size of the black pattern layer, a process 100-M1-1 for dividing the black pattern layer into a plurality of black pattern fragments according to a policy network of black pattern, and a process 100-M1-2 for combining the black pattern fragments according to a value network of black pattern layer. Similarly, the process 100-J-2 of transforming into an outline pattern layer is followed by a process 100-K-2 for adjusting the size of the outline pattern layer, a process 100-M1-1 for dividing the outline pattern layer into a plurality of outline pattern fragments according to a policy network of black pattern, and a process 100-M2-2 for combining the outline pattern fragments according to a value network of outline pattern layer. Similarly, the process 100-J-3 of transforming into an inner pattern layer is followed by a process 100-K-3 for adjusting the size of the inner pattern layer, a process 100-M3-1 for dividing the inner pattern layer into a plurality of inner pattern fragments according to a policy network of inner pattern, and a process 100-M2-2 for combining the inner pattern fragments according to a value network of inner pattern layer.

As illustrated, the processes 100-J-1, 100-K-1, 100-M1-1, 100-M1-2, the processes 100-J-2, 100-K-2, 100-M2-1, 100-M2-2, and the processes 100-J-3, 100-K-3, 100-M3-1, 100-M3-2 can be performed individually or in combination.

With continued reference to the flow charts 100A and 100C, the process 100-M1-2 for combining the black pattern fragments according to the value network of black pattern layer is followed by a decision process 100-N1 of comparing and determining a probability of match between pixels of each of the one or more image pattern layers (comprising combined black pattern fragments) against pixels of a stored image in a black pattern big database 100-S. Similarly, the process 100-M2-2 for combining the outline pattern fragments according to the value network of outline pattern layer is followed by a decision process 100-N2 of comparing and determining a probability of match between pixels of each of the one or more image pattern layers (comprising combined outline pattern fragments) against pixels of a stored image in an outline pattern big database 100-T. Similarly, the process 100-M3-2 for combining the inner pattern fragments according to the value network of inner pattern layer is followed by a decision process 100-N3 of comparing and determining a probability of match between pixels of each of the one or more image pattern layers (comprising combined inner pattern fragments) against pixels of a stored image in an inner pattern big database 100-U.

When the probability of match at each of the decision processes 100-N1, 100-N2, 100-N3 is determined to be less than the predetermined accuracy value, e.g., 90%, the one or more image pattern layers are discarded without being added to a respective one of the black pattern big database 100-S, outline pattern database 100-T and inner pattern database 100-U, and the method may end. When the probability of match at each of the decision processes 100-N1, 100-N2, 100-N3 is determined to be greater or equal to a predetermined accuracy value, e.g., greater than or equal to 70%, greater than or equal to 80%, greater than or equal to 90%, greater than or equal to 95%, or greater than a value within a range defined by any of these values, the one or more image pattern layers are added to a respective one of the black pattern big database 100-S, outline pattern database 100-T and inner pattern database 100-U. Thereafter, the method proceeds to a process 100-Q where the probabilities of match determined at the decision processes 100-N1, 100-N2, 100-N3 are averaged, whose value may be output, e.g., to a display device at a process 100-R.

Reference is now made to FIGS. 1D and 1E. FIG. 1D illustrates a neural network 100D when one of the processes 100-J-1, 100-J-2, 100-J-3 of transforming into a black pattern layer, outline pattern layer or an inner pattern layer is performed, while FIG. 1E illustrates a neural network 100E when all of the processes 100-J-1, 100-J-2, 100-J-3 of transforming into a black pattern layer, outline pattern layer and an inner pattern layer is performed. Each of neural networks 100D and 100E comprises successive layers B, D, E, F, J, K, Q and R, resulting from processes 100-B, 100-D1 through 10-D2, 100-E1 through 100-E3, 100-F, 100-J, 100-K, 100-Q and 100-R described above with respect to FIGS. 1A-1C, respectively. The neural network 100D additionally includes successive layers M-1, M-2 and N resulting from one of processes Mn-1, Mn-2 and Nn described above with respect to FIGS. 1A-1C, respectively, where n=1, 2 or 3. The neural network 100D additionally includes successive layers M-1, M-2 and N resulting from each of processes Mn-1, Mn-2 and Nn described above with respect to FIGS. 1A-1C, respectively, where n=1, 2 or 3.

In the following, detailed descriptions of various processes and layers described above with respect to FIGS. 1A-1E are provided.

Referring back to FIGS. 1A and 1B above, embodiments comprise receiving at the process 100-A an input image data from a video image-capturing device. The input data are represented as a plurality of images a1, a2, a3, . . . an in FIGS. 1D and 1E. According to embodiments, the input image data is a video image data comprising at least two image frames that are temporally separated but captured from the same scene. The input image data can include temporally successive photos taken from a scene at a rate between 1 and 1000 frames per second, according to embodiments. In some embodiments, the input image data can include successive photos taken using a low end camera at frame rates between about 30 and 60 frames per second. In some embodiments, the input image data can include successive photos taken using a high speed camera at frame rates in excess of 250 frames per second. It will be appreciated that the frame rate can depend, among other things, the imaging device employed. For example, when a charge-coupled device (CCD) or a CMOS active pixel sensor is employed to generate the input image data, frame rates exceeding 1,000 frames per second or higher can be possible.

After receiving the input image data, the method according to embodiments proceeds to a decision process 100-B (FIGS. 1A, 1B) for identifying one or more candidate moving objects in the scene based on whether a change in RGB values has occurred in pixels associated with the one or more candidate moving objects between two of the at least two image frames. Whether or not a change in RGB values has occurred can be determined using one of several ways. The pixels of input image data can be defined by luminance and chrominance values. Accordingly, the change in RGB values can be detected based on whether a change has occurred in the luminance value of the image input data or the chrominance value of the image input data. By way of example only, in RGB or sRGB color spaces, each pixel can have a relative luminance Y represented by the equation Y=rR+gG+bB, where R, G, and B represent color components red, green and blue and r, g, b are constants. For example, for sRGB space, the constants r, b, and b have values 0.212, 0.7152, and 0.0722, respectively. Accordingly, a determination as to whether or not a change in RGB values has occurred can be made based on whether and change in R, G, B values individually or in combination using relationships such as Y=rR+gG+bB.

Figure 2:
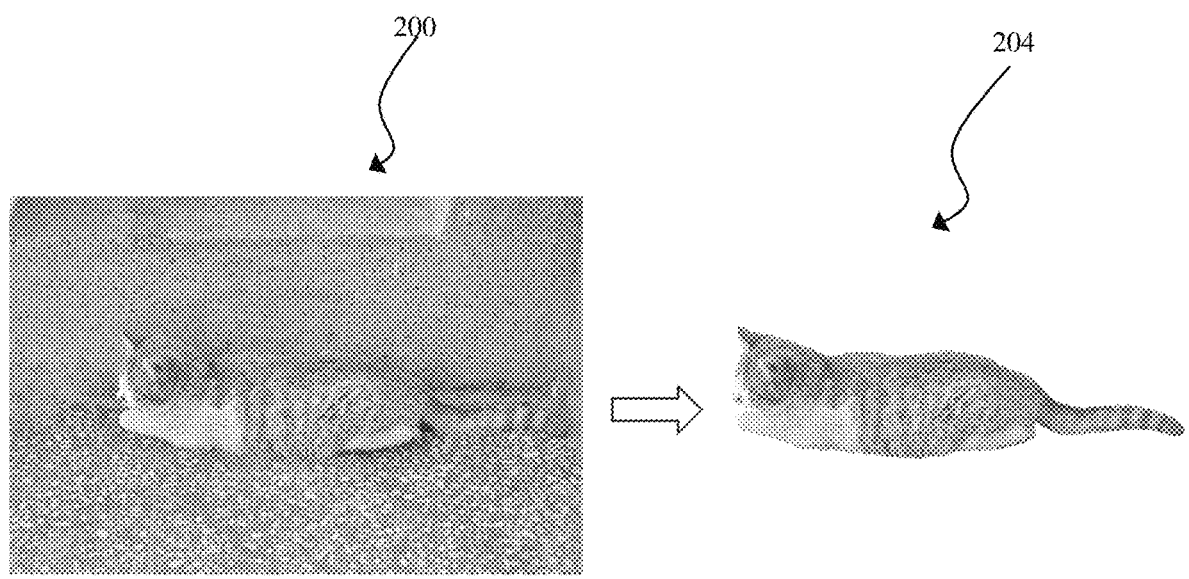
FIG. 2 illustrates the processes of extracting one or more candidate objects, according to embodiments.

Upon making a determination at the decision process 100-B (FIGS. 1A, 1B) that a change in RGB values has occurred, the method proceeds to processes 100-D-1 and 100-D-2 (FIGS. 1A, 1B) for extracting the one or more candidate objects, according to embodiments. FIG. 2 illustrates the processes of extracting one or more candidate objects, according to embodiments. In the illustrated example, the input image data 200 may include one or more candidate objects, which is a cat in the input image data 200. In the illustrated example, the process 100-D-1 (FIGS. 1A, 1B) includes extracting an image portion 204, which includes the pixels associated with the one or more candidate moving objects, which is the cat in the illustrated example.

An example implementation of the process of extracting one or more candidate objects is further illustrated with respect to FIGS. 3A and 3B. In the illustrated examples, one or more candidate objects are extracted by comparing two image frames that are temporally spaced apart, and upon detecting a change in RGB values, an object is determined to have moved, and pixels included in the object is extracted from the latter of the two image frames. Referring to FIGS. 3A and 3B, the object extraction includes comparing two image frames that are temporally spaced apart. In FIG. 3A, the candidate object is a piece of paper on a pavement, which is not present in the first image frame but appears in the second image frame. According to embodiments, the range of extracted pixels RGB values have changed under this circumstance includes the pixels corresponding to the entire piece of paper in the second image frame. In FIG. 3B, the candidate object is also a piece of paper on a pavement. Unlike FIG. 3A, the piece of paper is present in both the first and second image frames, however, the position of the piece of paper is different between the two image frames. According to embodiments, the range of extracted pixels RGB values have changed under this circumstance also includes the pixels corresponding to the entire piece of paper in the second image frame.

Under some circumstances, when the candidate objects are extracted as described above, the extracted pixels may include those pixels corresponding to other objects or noise. Thus, in some implementations, additional processing may be performed to the extracted object.

Referring to FIG. 4, additional processing may include noise filtering and clutter deletion. In FIG. 4, an object of interest is a horse on a beach. However, other objects surrounding the horse may also move in time, e.g., sand and waves. As described herein, when moving objects, regardless of whether they are real or not, are too small relative to the image frame to be analyzed accurately, they may be classified as noise. In the illustrated example, sand surrounding the horse may be classified as noise. The classification of a moving feature as noise may be based on the pixel size of the feature. For instance, when the number of pixels of a moving feature is less than 1%, 0.5%, 0.1%, 0.05%, 0.01%, 0.005%, 0.001% or smaller, or is within a range defined by any of these values, relative to the size of the input image frames, the feature may be classified as noise. As described herein, when moving objects, even though they may be sufficiently large to not be classified as noise, may nevertheless be unassociated with the object of interest, and may be classified as clutter. In the illustrated example, moving tides surrounding the horse may be classified as clutter. The classification of a moving feature as clutter may be based, e.g., density or sparsity of the pixels of the feature. For instance, when the number of pixels of a moving feature has a spatial density less than 1%, 0.5%, 0.1%, 0.05%, 0.01%, 0.005%, 0.001% or smaller, or is within a range defined by any of these values, relative to the input image frames, the feature may be classified as clutter. According to embodiments, after extracting according to the process 100-D-1 (FIGS. 1A, 1B), the extracted image may further be processed to remove noise and clutter.

Figure 5A:
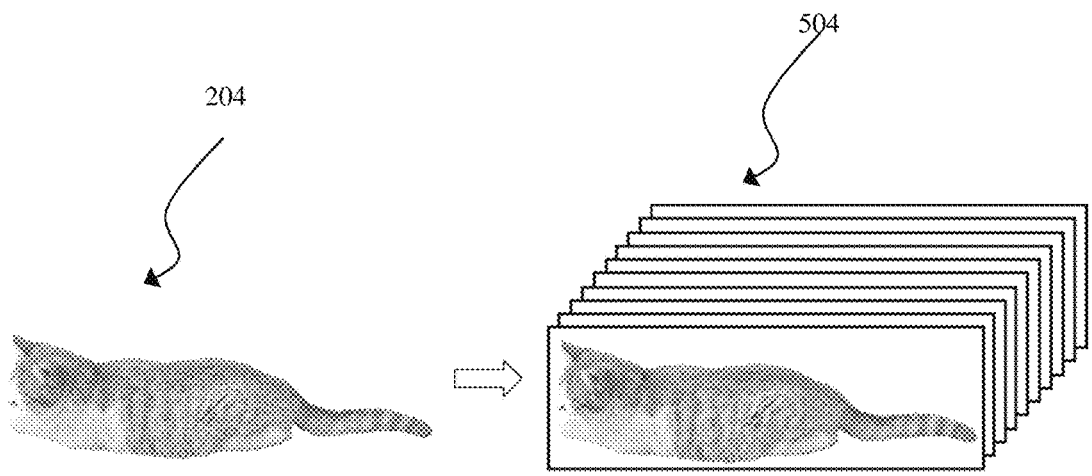
FIG. 5A illustrates creating a plurality of image layers corresponding to image frames having one or more identified candidate moving objects, according to embodiments.

According to embodiments, the process 100-D-2 (FIGS. 1A and 1B) includes creating a plurality of image layers corresponding to each of the at least two image frames having the one or more identified candidate moving objects. According to embodiments, once an object is determined to be a moving object as described above, the plurality of image layers are created automatically upon determining that the RGB values have changed in the decision process 100-B, without user intervention. This is illustrated in FIG. 5A, where the cat has been determined to be a moving object according to methods described above. Upon making the determination, a plurality of layers 504 are created, each corresponding to a frame of the input image data. Each of the image layers comprises the extracted image portion which includes the pixels associated with the one or more candidate moving objects.

Figure 5B:
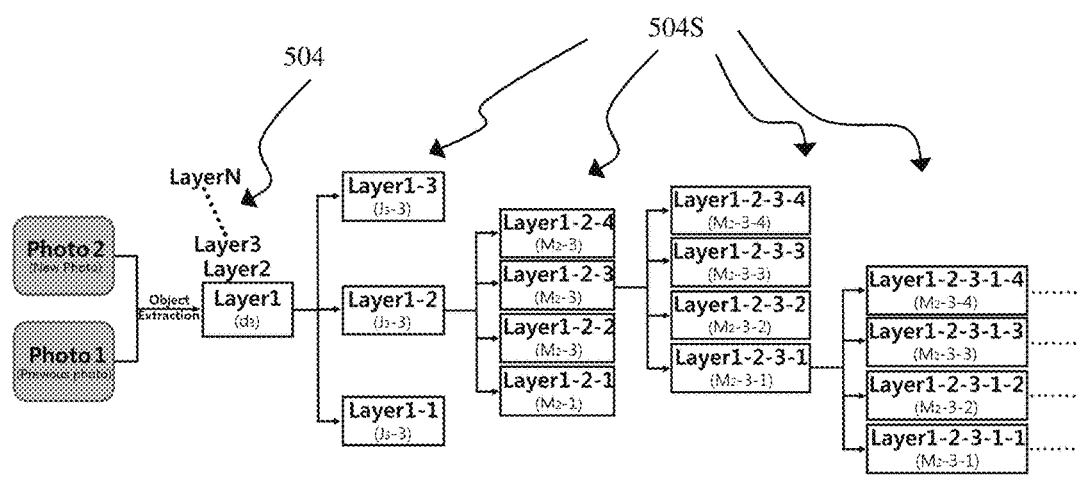
FIG. 5B illustrates an automatic creation of layer from an extracted image and creation of sublayers therefrom, according to embodiments.

FIG. 5B illustrates automatic creation of a plurality of layers 504 from the extracted object 204, and automatic creation of a plurality of sublayers 504s, also referred to herein as fragments, from at least some of the layers 504, according to embodiments. Upon creation, a unique identifier associated with the layer. By way of example, in the illustrated example, a plurality of layers 1, 2, . . . N are created from an extracted object 204 (FIG. 5A), a plurality of sublayers 1-1, 1-2, . . . 1-$i$ are created from the layer 1, a plurality of sub-sub layers 1-2-1, 1-2-2, . . . 1-2-$j$ are created from the sub layer 1-2, a plurality of sub-sub-sub layers 1-2-3-1, 1-2-3-2, . . . 1-2-3-$k$ are created from the sub-sub layer 1-2-3, and a plurality of sub-sub-sub-sub layers 1-2-3-1-1-, 1-2-3-1-2, . . . 1-2-3-1-1 are created from the sub-sub-sub layer 1-2-3-1, and so on.

After creation of the plurality of layers corresponding to the extracted moving object(s) according to the process 100-D-2 (FIGS. 1A and 1B), the method according to embodiments proceeds to perform one or more optional processes 100-E-1, 100-E-2 and 100-E-3 of boxing, locking-on and tracking, respectively. The processes 100-E-1, 100-E-2 and 100-E-3 are illustrated in detail with respect to FIGS. 6-8.

Figure 6:
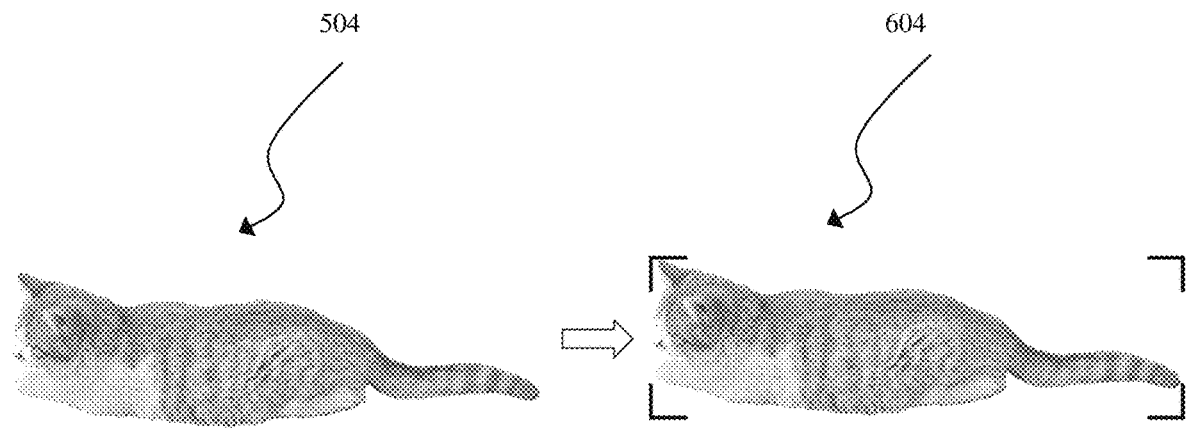
FIG. 6 illustrates boxing candidate moving objects in extracted layers, according to embodiments.

Referring to FIG. 6, in some embodiments, each of the layers created according to the extracted moving object(s) may be boxed according to the process 100-E-1 (FIGS. 1A, 1B). As illustrated, boxing includes creating a boxed region 604 of pixels having a single color, e.g., white, around the extracted object, i.e., the cat in the illustrated example. While the region around the extracted moving object in the illustrated embodiment is a rectangular box and includes white pixels outside the edges of the moving object, other shapes of the region surrounding the moving object are possible, e.g., polygonal shapes, and other colors of pixels surrounding the moving object are possible, e.g., pixels having any luma or chroma values so long as they are uniform.

Figure 7:
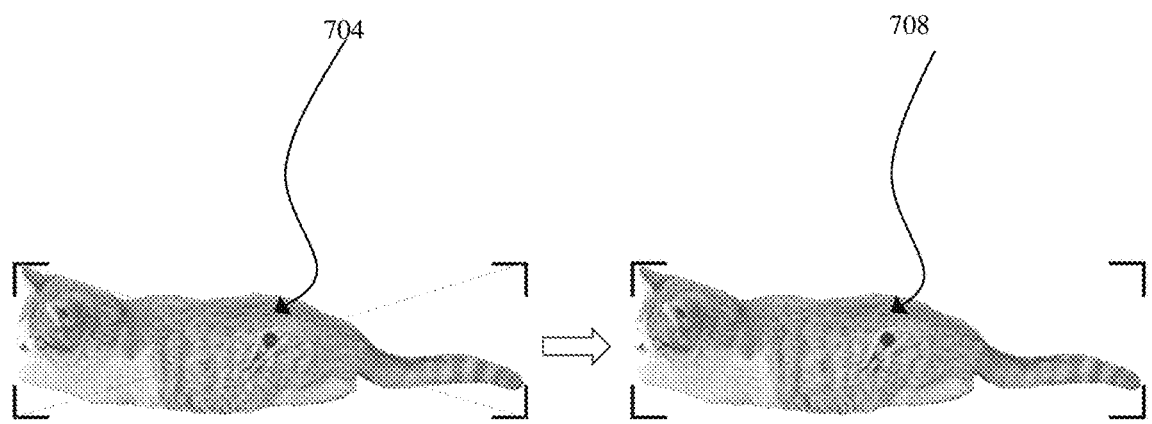
FIG. 7 illustrates locking on boxed candidate moving objects in extracted layers, according to embodiments.

Referring to FIG. 7, in some embodiments, the extracted moving object(s), which may be boxed, in each of the layers may be locked-on according to the process 100-E-2 (FIGS. 1A, 1B). As illustrated, locking on includes creating lines 704 connecting corners of the boxed region 604 around the extracted object, i.e., the cat in the illustrated example. One or more pixels at the point 708 of intersection of the lines may be locked on for subsequent tracking. While the intersection 708 of the lines 704 in the illustrated embodiment is an intersection of diagonals of the rectangular box, other types of intersections are possible, e.g., intersections of lines connecting any corners of polygonal shapes.

Figure 8:
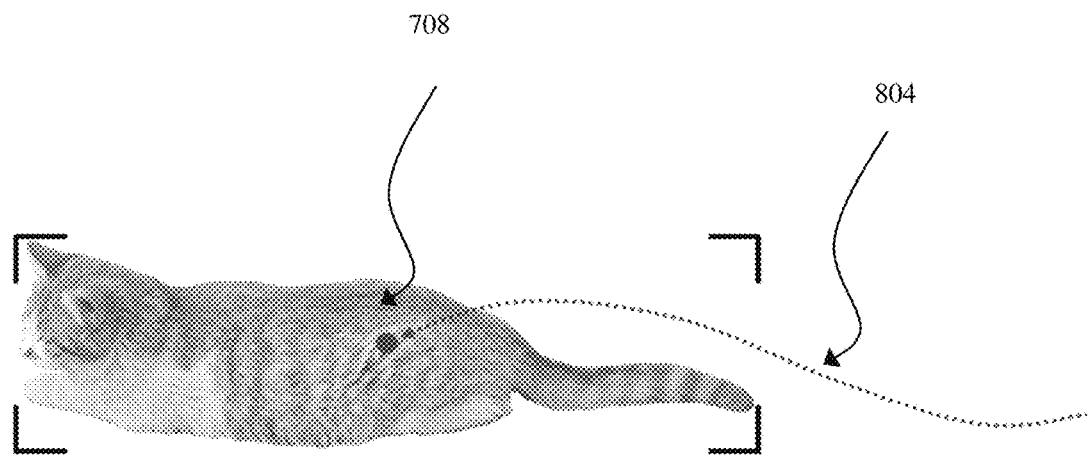
FIG. 8 illustrates tracking locked-on candidate moving objects in extracted layers, according to embodiments.

Referring to FIG. 8, in some embodiments, the extracted moving object(s), which may be boxed and/or locked on, in each of the layers may be tracked according to the process 100-E-1 (FIGS. 1A, 1B). As illustrated, tracking includes tracking pixels represented by the intersection 708 created by locking on. It will be appreciated that, because the position of the moving object is represented by a few pixels at the intersection 708 resulting from the locking-on process 100-E-2, tracking the path 804 of the moving object(s) in subsequent image frames is relatively low computing resource-intensive, compared to tracking the entire or even portions of the moving object(s).

At the decision process 100-E (FIGS. 1A, 1B), a decision is made as to whether the layers created in processes 100-D-1, 100-D-2 include greater than a predetermined minimum number of pixels. Inventors have found that, when the relative number of pixels representing the moving object(s), i.e., the relative size of the moving object(s) relative to the entire image frame, is small, the probability of successfully identifying the object is relatively low. Thus, according to embodiments, upon determining that the layers created in processes 100-D-1, 1-D-2 do not exceed the predetermined minimum number of pixels, the method does not proceed. On the other hand, upon determining that the layers created in processes 100-D-1, 1-D-2 do exceed the predetermined minimum number of pixels, the method proceeds to the process 100-H for creating a set of noise-filtered image layers from the plurality of image layers created in processes 100-D-1, 100-D-2. Each noise-filtered image layer includes moving object(s) each having greater than the predetermined minimum number of pixels, which can be greater than 1%, 0.5%, 0.1%, 0.05%, 0.01%, 0.005%, 0.001%, or within a range defined by any of these values, relative to the size of the input image frames, but higher than the number of pixels for determining the feature the feature may be classified as noise as discussed with respect to FIG. 4. For example, if each of the input image frames contains 1 megapixels, each noise-filtered image layer includes moving object9s) each having the number of pixels greater than about 10,000, 5,000, 1000, 500, 100, 50, 10 or within a range defined by any of these values.

Figure 9:
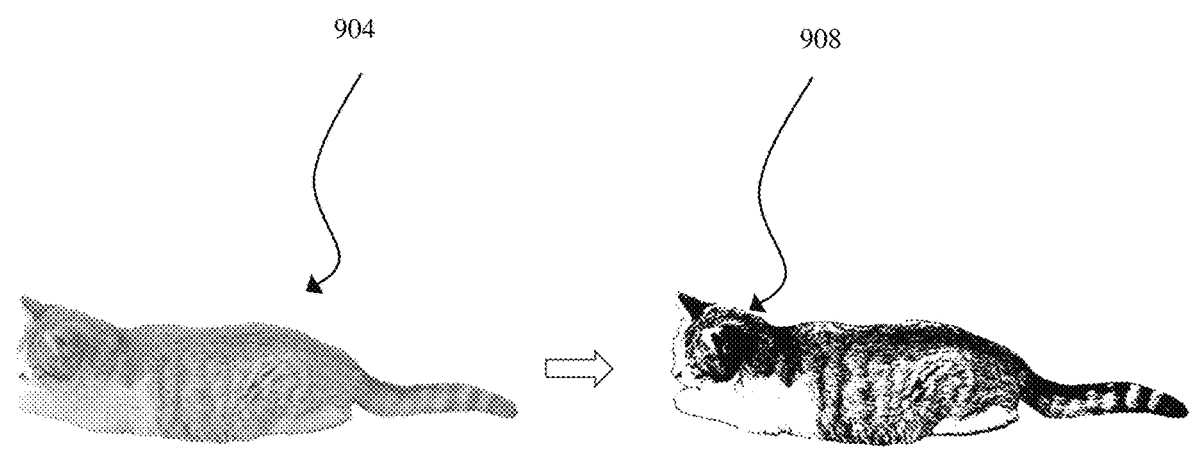
FIG. 9 illustrates transforming a set of noise-filtered image layers into a set of gray scale image layers, according to embodiments.

The process 100-H (FIGS. 1A, 1C) includes transforming the set of noise-filtered image layers into a set of gray scale image layers, as illustrated in FIG. 9, where a noise-filtered mage layer 904 is transformed in to a gray scale image layer 908, where the cat is the moving object discussed above. For example, each of the gray scale image layers may be converted to one of a 1 bit black and white image layer, 8 bit grayscale image layer or a 16-bit grayscale image layer from a 24 bit RGB noise-filtered image layer, 32 bit noise-filtered CMYK image layer or a 48 bit noise-filtered RGB image layer.

Referring back now to the flow charts 100A and 100C, after completion of the process 100-H, the method proceeds to transforming at a processes 100-J-1 and/or transforming at a process 100-J-2 and/or transforming at a process 100-J-3, in which each image layer of the set of gray scale image layers are transformed into one or more image pattern layers, wherein each of the one or more image pattern layers comprises a pattern representing one of the one or more candidate moving objects. As described in detail below, each of the processes 100-J-1, 100-J-2 and 100-J-3 prepare layers for deep learning based on compound artificial intelligence.

Figure 10:
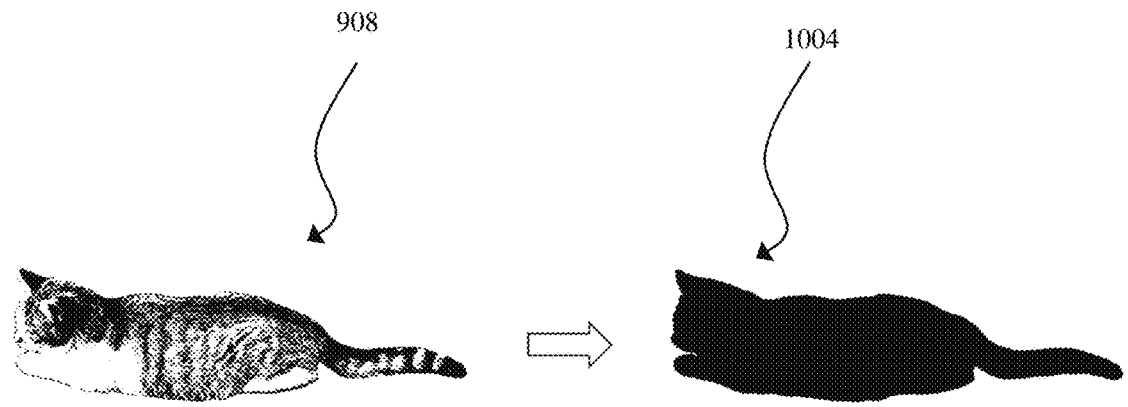
FIG. 10 illustrates transforming an image layer into a black pattern layer comprising a solid-filled pattern representing one or the one or more candidate moving objects, according to embodiments.

FIG. 10 illustrates the process 100-J-1 for transforming each of the gray scale image layers 908 described above into a black pattern layer 1004 comprising a solid-filled pattern representing the one or the one or more candidate moving objects. As illustrated, the process 100-J-1 includes generating an outline of each of the moving object(s), the cat in the illustrated example, and converting all internal pixels of each of the moving object(s) into a 1 bit black pixel.

Figure 11:
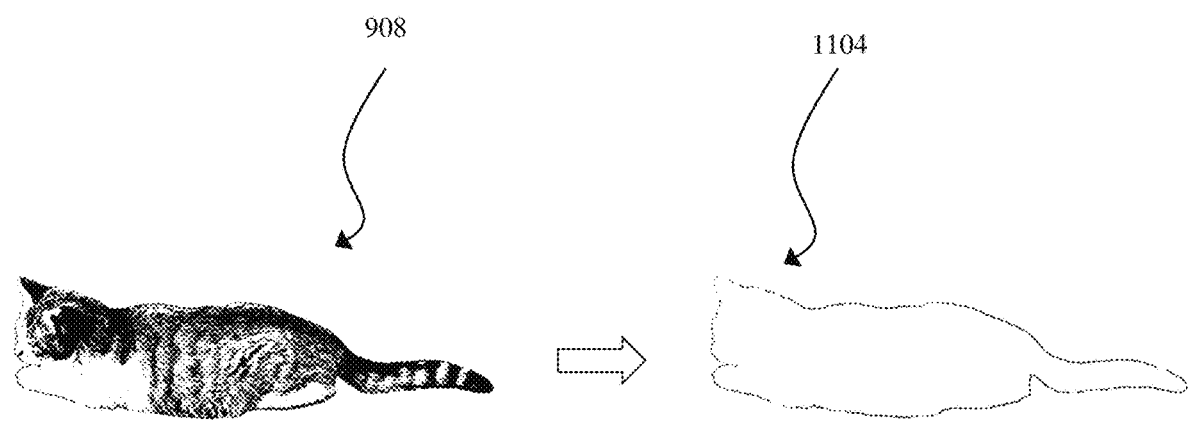
FIG. 11 illustrates transforming an image layer into an outline pattern layer comprising a contiguous outer outline representing one or more candidate moving objects, according to embodiments.

FIG. 11 illustrates the process 100-J-2 of each of the gray scale image layers 908 described above into an outline pattern layer 1104 comprising a contiguous outer outline representing the one or more candidate moving objects. As illustrated, the process 100-J-2 includes generating an outline of each of the moving object(s), the cat in the illustrated example, and converting all pixels of the outline into a 1 bit black pixel.

Figure 12:
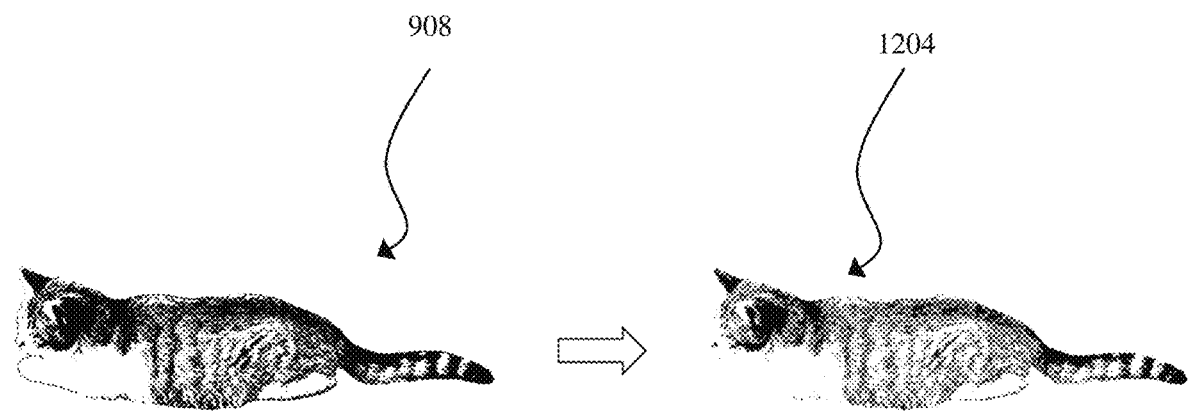
FIG. 12 illustrates transforming an image layer into an inner pattern layer comprising patterns inside an outer outline representing one or more candidate moving objects, according to embodiments.

FIG. 12 illustrates the process 100-J-3 of each of the gray scale image layers 908 described above into an inner pattern layer 1204 comprising patterns inside an outer outline representing the one or more candidate moving objects. In some implementations, the inner pattern layer 1204 may exclude the outer outline representing the one more candidate moving objects described above with respect to FIG. 11. As illustrated, the process 100-J-2 includes generating an outline of each of the moving object(s), the cat in the illustrated example, and converting all pixels of the outline into a 1 bit black pixel.

Referring back to the flow charts 100A and 100C (FIGS. 1A and 1C), the process 100-J-1 of transforming into a black pattern layer 1004 is followed by a process 100-K-1 for adjusting the size of the black pattern layer 1004. Similarly, the process 100-J-2 of transforming into an outline pattern layer is followed by a process 100-K-2 for adjusting the size of the outline pattern layer 1104, and the process 100-J-3 of transforming into an inner pattern layer is followed by a process 100-K-3 for adjusting the size of the inner pattern layer 1204. The sizes of the moving objects in the black pattern layer 1004, the outline pattern layer 1104 and the inner pattern layer 1204 are adjusted, e.g., increased or decreased in the number of pixels, to have corresponding or comparable sizes relative to respective ones of the library objects in the black pattern big database 100-S, the outline pattern database 100-T and the inner pattern database 100-U.

Figure 13:
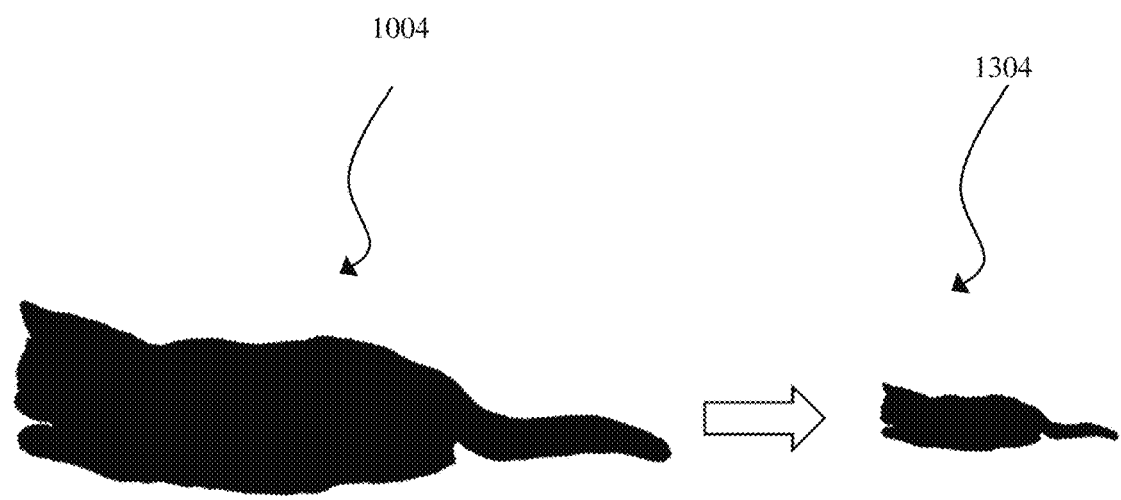
FIG. 13 illustrates transforming a black pattern layer into a size-adjusted black pattern layer, according to embodiments.
Figure 14:
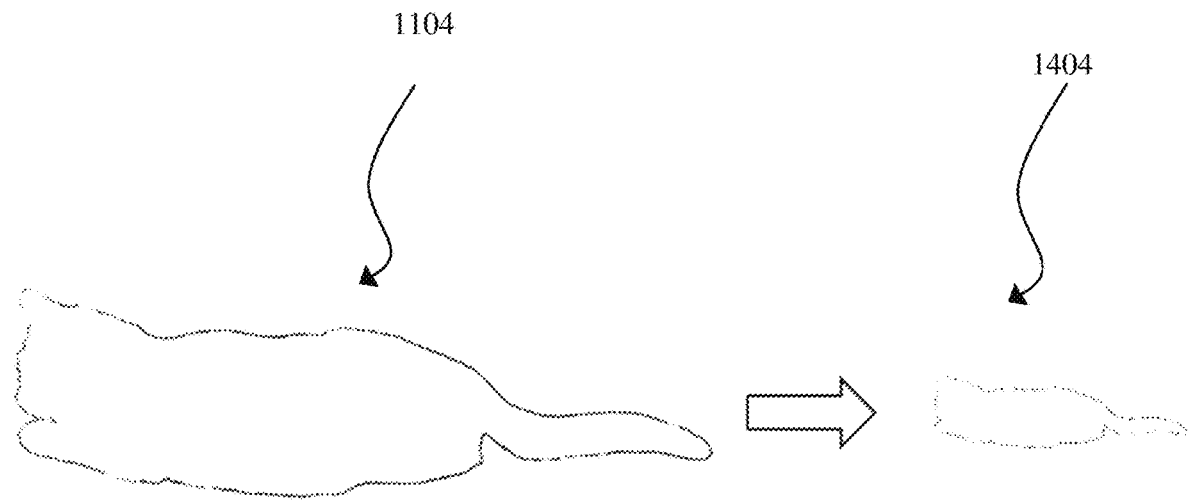
FIG. 14 illustrates transforming an outline pattern layer into a size-adjusted outline pattern layer 1404, according to embodiments.
Figure 15:
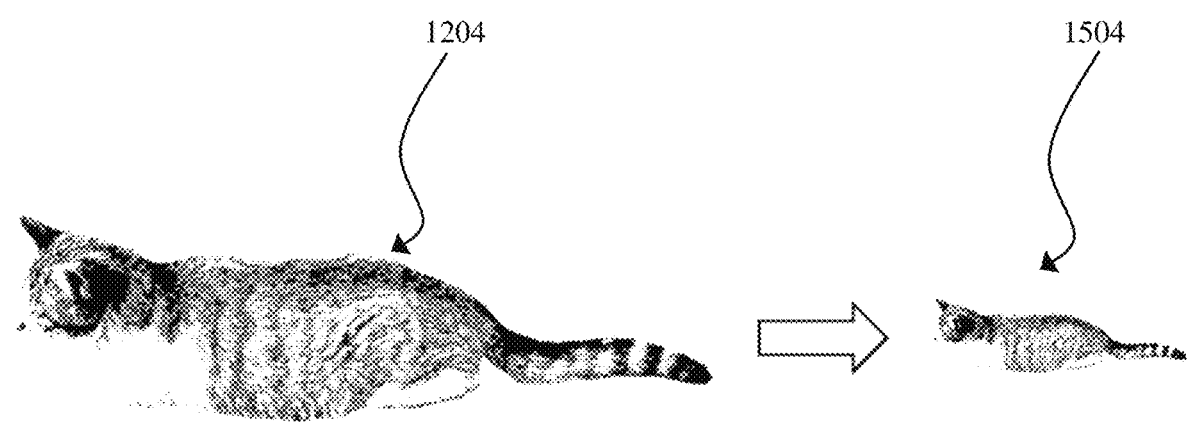
FIG. 15 illustrates transforming an inner pattern layer into a size-adjusted inner pattern layer, according to embodiments.

In embodiments, the adjustments result the moving objects in the size-adjusted black pattern layer 1004, the size-adjusted outline pattern layer 1104 and the size-adjusted outline patter layer 1204 having sizes relative to the respective ones of the library objects in the black pattern big database 100-S, the outline pattern database 100-T and the inner pattern database 100-U, within 5%, 10%, 20%, 50% or 100%, or within any range defined by these values. FIGS. 13, 14 and 15 illustrate the processes 100-K-1, 100-K-2 and 100-K-3 for transforming the black pattern layer 1004 into a size-adjusted black pattern layer 1304, for transforming the outline pattern layer 1104 into a size-adjusted outline pattern layer 1404, and for transforming the inner pattern layer 1204 into a size-adjusted inner pattern layer 1504.

Figure 16:
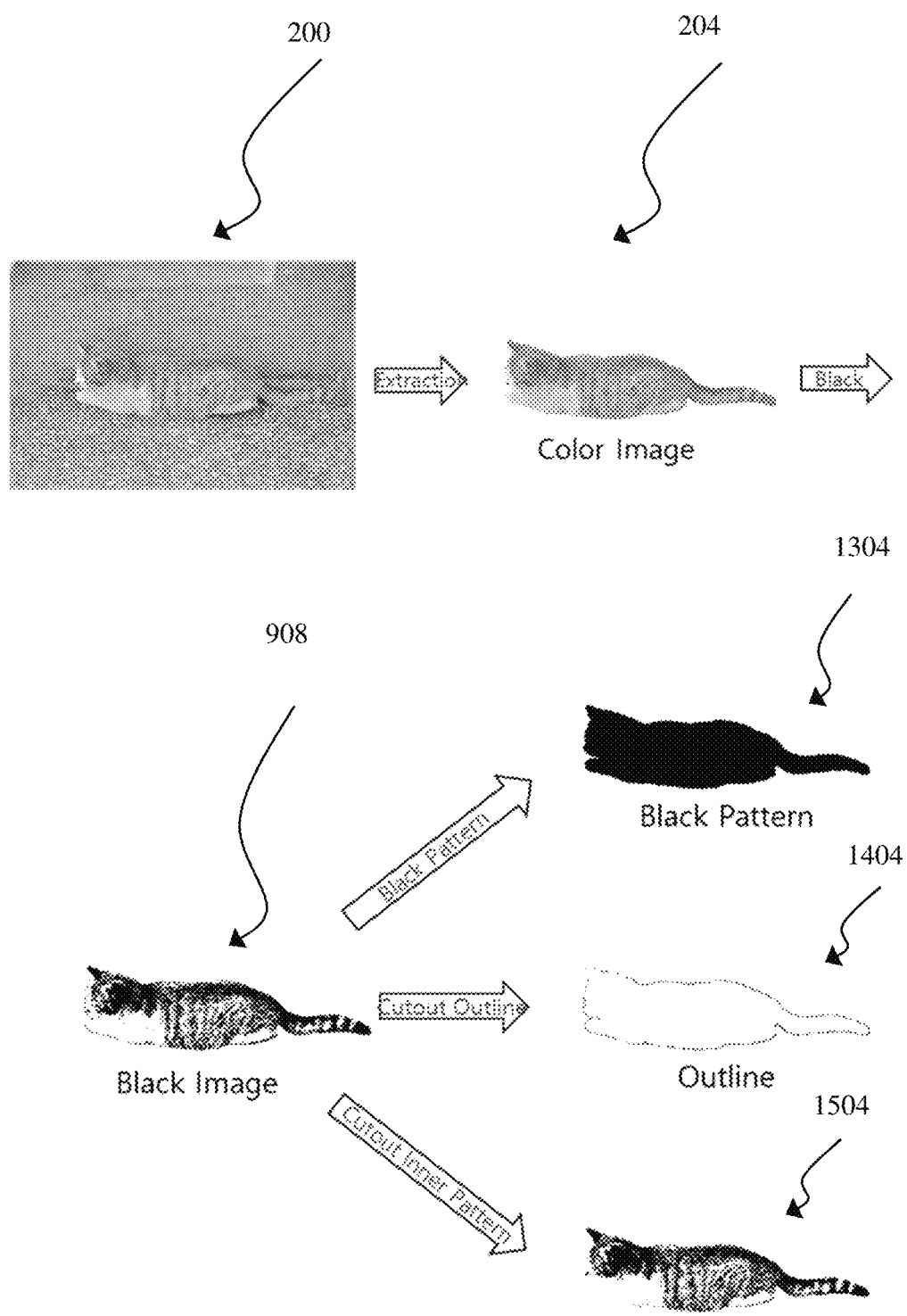
FIG. 16 illustrates a method according to embodiments in which an input image data is processed and transformed into a size-adjusted black pattern layer, a size-adjusted outline pattern layer and a size-adjusted inner patter layer, according to embodiments.

FIG. 16 illustrates the method according to embodiments as the input image data 200 is processed and transformed into size-adjusted black pattern layer 1304, size-adjusted outline pattern layer 1404 and size-adjusted inner patter layer 1504. By way of one example, one frame of the input image data 200 may be, e.g., one megapixel 24 bit RGB image frame corresponding to 3 megabytes of data (3 bytes per pixel). As discussed above, because the method extracts the portion in which RGB values have changed, the data size is immediately reduced after extraction down to, e.g., about 10% of the input image data 200, to about 0.30 megabytes in the illustrated example. After transformation into a gray scale image layer 908, e.g., 8 bit grayscale, the data size is reduced down by a factor of three, to about 0.1 megabytes (to 1 byte per pixel). Upon transformation into the black pattern layer 1004, the outline pattern layer 1104 and the inner pattern layer 1204, the data size is further reduced by a factor of eight to 0.013 megabytes (⅛ byte per pixel). Upon transformation into the size-adjusted black pattern layer 1304, the size-reduced outline pattern layer 1404 and the size-adjusted inner pattern layer 1504, the data size may still further reduced by several factors to of the order of 0.001 megabytes. Thus, it will be appreciated that, for the illustrated example, the original input image data 200 having a data size of 3 megabytes has been reduced down by over three orders of magnitude down to about one kilo bytes. In various other embodiments, the original input image data 200 having a data size can be reduced down by over two, three, four, five, six, seven, eight or more orders of magnitudes, or by factor in a range defined by any of these values, down to about one 100 kilobytes or less, 10 kilobytes or less, 1 kilobytes or less, 0.1 kilobytes or less, or 0.01 kilobytes or less, or down to a size in a range defined by any of these values. It is an advantage that, because of the reduction in data size, subsequent deep learning algorithm can be executed efficiently locally, e.g., on handheld devices and personal computers, and without a need for relying on powerful external (e.g., cloud) computing and storage devices.

Referring back to FIGS. 1A and 1C and FIG. 16, for subsequent comparison and analysis of the size-adjusted black pattern layer 1304 is processed through the process 100-M1-1 for dividing the black pattern layer into a plurality of black pattern fragments according to a policy network of black pattern, and a process 100-M1-2 for combining the black pattern fragments according to a value network of black pattern layer. Similarly, the size-adjusted outline pattern layer 1404 is process through the process 100-M1-1 for dividing the outline pattern layer into a plurality of outline pattern fragments according to a policy network of black pattern, and a process 100-M2-2 for combining the outline pattern fragments according to a value network of outline pattern layer. Similarly, the size-adjusted inner pattern layer 1504 are processed through the process 100-M3-1 for dividing the inner pattern layer into a plurality of inner pattern fragments according to a policy network of inner pattern, and a process 100-M2-2 for combining the inner pattern fragments according to a value network of inner pattern layer. According to embodiments, comparison and analysis of the size-adjusted black pattern layer 1304, the size-adjusted outline pattern layer 1404 and the size-adjusted inner pattern layer 1504 includes the process of dividing into a plurality of fragments and combining the fragments according to a method referred to as Monte Carlo tree search method.

Figure 17:
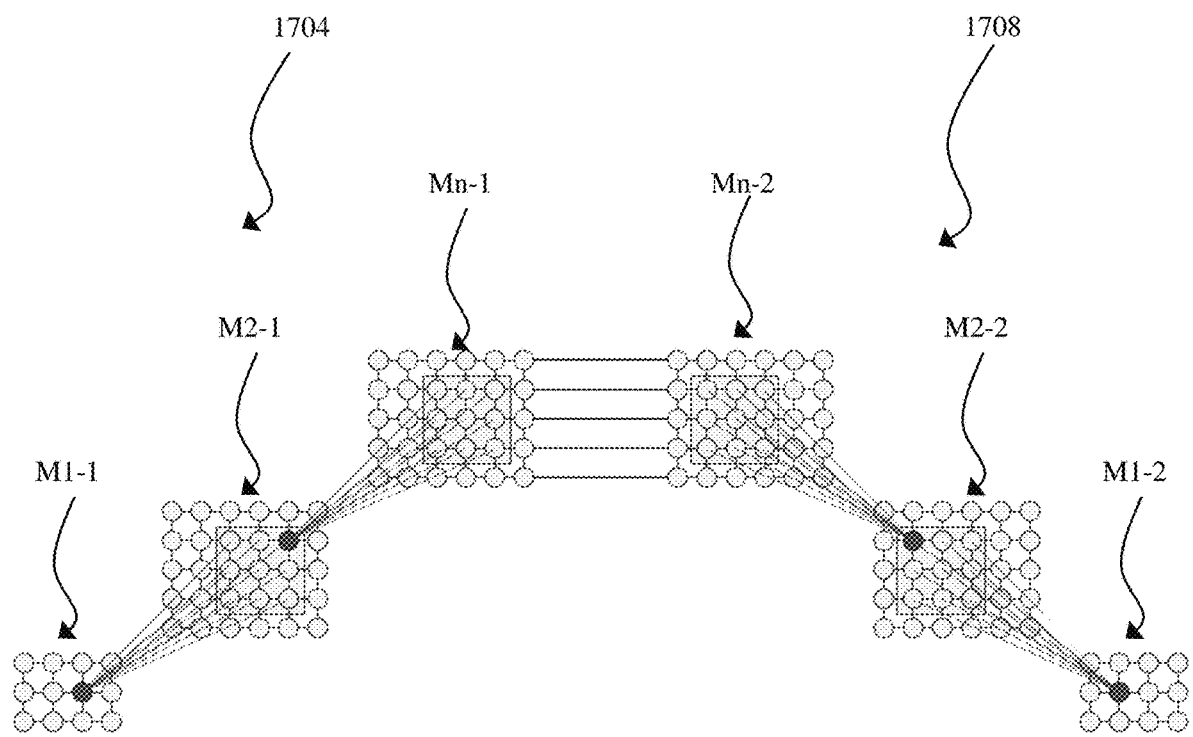
FIG. 17 illustrates a Monte Carlo tree search method according to embodiments, which employs a combination of policy networks and value networks.

FIG. 17 illustrates the Monte Carlo tree search method according to embodiments, which employs a combination of policy networks 1704 and value networks 1708. The policy networks 1704 comprise successively dividing one or more of the size-adjusted black pattern layer 1304, the size-adjusted outline pattern layer 1404 and the size-adjusted inner pattern layer 1504 into m (e.g., 0, 4, 9, 16, etc.) fragments in each of n slices, or sublayers M1-1, M2-1, ... Mn-1, where the Mn-1 slice or sublayer has the smallest number of pixels greater than 1 pixel. Thus, number of slices n depends on the image size of the starting layer. For example, in the example described above with respect to FIG. 16, if the initial layer M1-1 (which may be the size-adjusted black pattern layer 1304, the size-adjusted outline pattern layer 1404 or the size-adjusted inner pattern layer 1504) is about 10,000 pixels, and if m=9, M2-1, M3-1, M 4-1 and M5-1 has 1,111, 123, 13 and 1.5 pixels, respectively. Still referring to FIG. 17, the value networks 1708 comprise successively combining m (e.g., 9) fragments from the previous slice in each of the Mn-2, M(n–1)-2, . . . M(n+1)-1, . . . M1-2 slices, such that the M1-2 slice has the same number of pixels as the slice M1-2. According to embodiments, the value networks (M1-2, M2-2, . . . Mn-2) are used to compare and analyze with the black pattern big database 100-S, outline pattern database 100-T and inner pattern database 100-U to identify the moving object(s). According to embodiments, creation of layers and sublayers having unique identifiers are automatic, as illustrated above with respect to FIG. 5B.

As illustrated, the processes 100-J-1, 100-K-1, 100-M1-1, 100-M1-2, the processes 100-J-2, 100-K-2, 100-M2-1, 100-M2-2, and the processes 100-J-3, 100-K-3, 100-M3-1, 100-M3-2 can be performed individually or in combination, and serially or in parallel, according to embodiments.

In some embodiments, comparison and analysis of the size-adjusted black pattern layer 1304, the size-adjusted outline pattern layer 1404 and the size-adjusted inner pattern layer 1504 may omit the process of dividing into a plurality of fragments and combining the fragments according to a method referred to as Monte Carlo tree search method. In these embodiments, the size-adjusted layers can be directly compared against stored image objects in a big database, as discussed in detail below.

With reference back to the flow charts 100A and 100C (FIGS. 1A, 1C), the process 100-M1-2 for combining the black pattern fragments according to the value network of black pattern layer is followed by a decision process 100-N1 of comparing and determining a probability of match between pixels of each of the one or more image pattern layers (comprising combined black pattern fragments) against pixels of a stored image in a black pattern big database 100-S. Similarly, the process 100-M2-2 for combining the outline pattern fragments according to the value network of outline pattern layer is followed by a decision process 100-N2 of comparing and determining a probability of match between pixels of each of the one or more image pattern layers (comprising combined outline pattern fragments) against pixels of a stored image in an outline pattern big database 100-T. Similarly, the process 100-M3-2 for combining the inner pattern fragments according to the value network of inner pattern layer is followed by a decision process 100-N3 of comparing and determining a probability of match between pixels of each of the one or more image pattern layers (comprising combined inner pattern fragments) against pixels of a stored image in an inner pattern big database 100-U.

Figure 18:
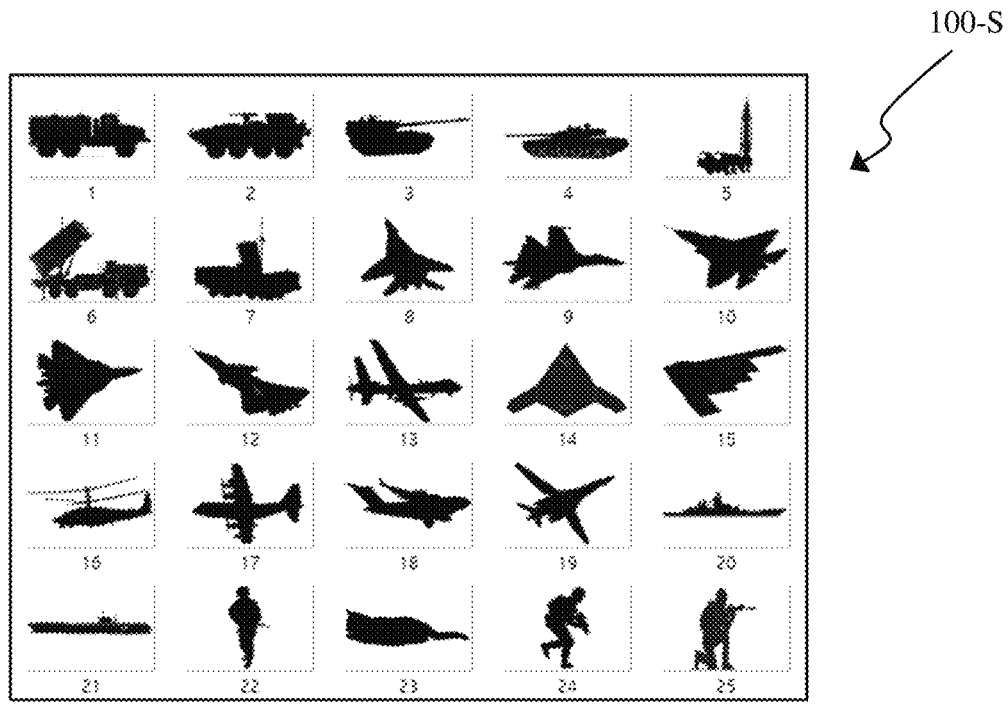
FIG. 18 illustrates a black pattern big database, according to embodiments.
Figure 19:
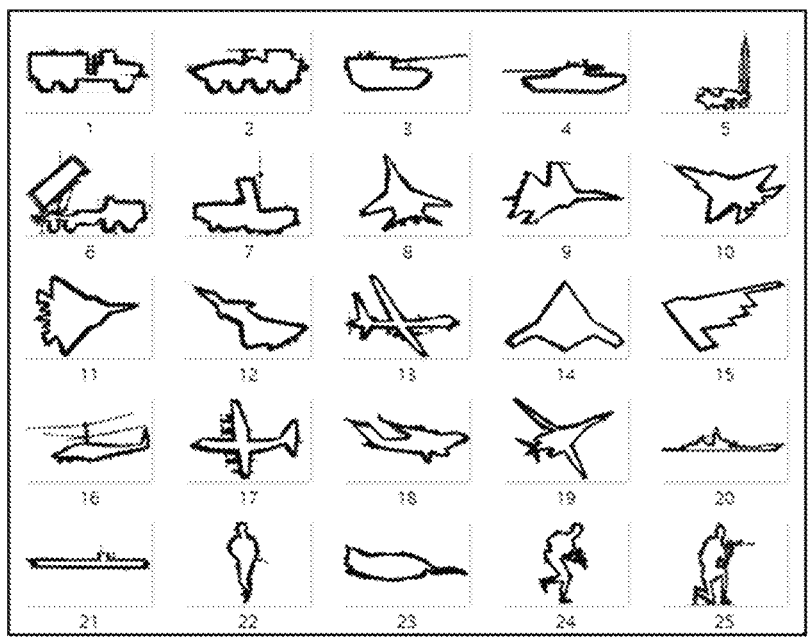
FIG. 19 illustrates an outline pattern big database, according to embodiments.
Figure 20:
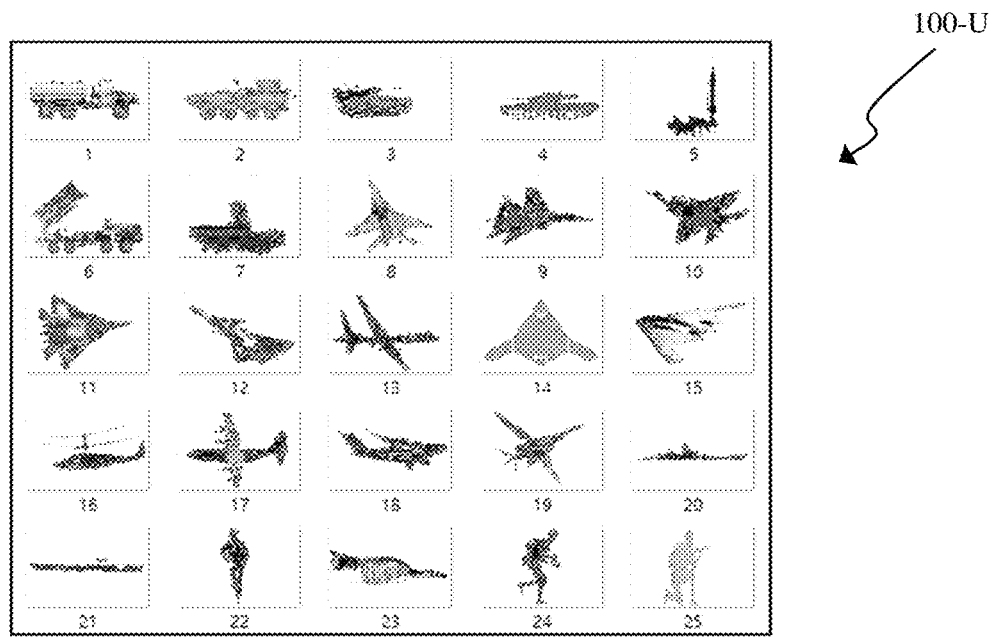
FIG. 20 illustrates an inner pattern big database, according to embodiments.

With reference to FIGS. 18, 19 and 20, the big databases 100-S, 100-T and 100-U are described. At a given moment, each of the big databases 100-S, 100-T and 100-U stores a plurality of stored images that have patterns that match the type of pattern as the associated pattern type of the layer being analyzed. That is, the black pattern big database 100-S stores a plurality of stored images 100-5-1, 100-S-2, . . . 100-S-n that are images of objects rendered as solid-filled patterns, the outline pattern big database 100-T stores a plurality of stored images 100-T-1, 100-T-2, . . . 100-T-n that are images of objects rendered as contiguous outer outlines, and the inner pattern big database 100-U stores a plurality of stored images 100-U-1, 100-U-2, . . . 100-U-n that are images of objects rendered as patterns inside an outer outline.

In addition, each of the big databases 100-S, 100-T and 100-U stores a plurality of stored images that have patterns that match the size and as the associated pattern type of the layer being analyzed. For example, as described above, if the comparisons and analyses being made are the size-adjusted black pattern layer 1304, the size-adjusted outline pattern layer 1404 and the size-adjusted inner pattern layer 1504, the stored images that are being compared thereto may be similar in size. As described above, because the size can be smaller, e.g., a kilobytes or less, the big databases can be physically disposed locally on the computing device, e.g., RAM, ROM or storage of the computing device.

The big databases 100-S, 100-T and 100-U are dynamic databases that grow in number of stored object images of objects through self-learning by the neural networks 100D, 100E (FIGS. 1D, 1E). As described below, the number in stored imaged image objects grow in size with increasing iterations over time, because image pattern layers, e.g., the size-adjusted black pattern layer 1304, the size-adjusted outline pattern layer 1404 and the size-adjusted inner pattern layer 1504, or any of the earlier layers, increases whenever a probability of a match against an existing stored image exceeds a predetermined value.

Advantageously, as the number of stored object images in the big databases 100-S, 100-T and 100-U grow in number through self-learning by the neural networks 100D, 100E (FIGS. 1D, 1E), the accuracy of matching improves.

Figure 21:
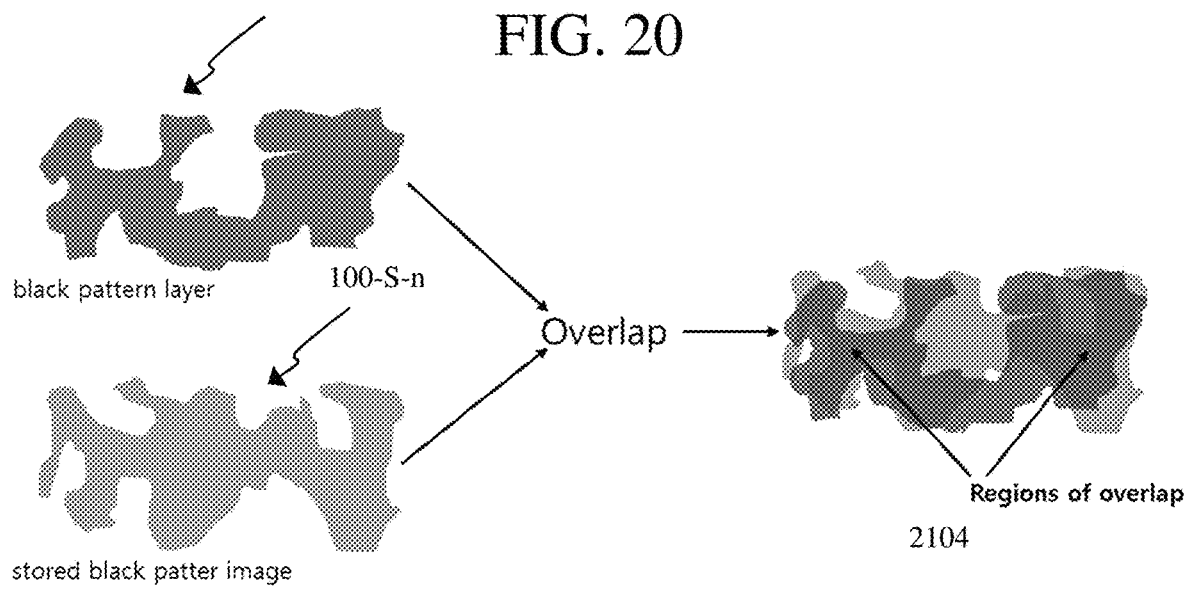
FIG. 21 illustrates comparing and determining a probability of match between a black pattern layer and a stored image in the black pattern big database, according to embodiments.

FIG. 21 illustrates an example process 100-N1 of comparing and determining a probability of match (PM) between a black pattern layer, e.g., the size-adjusted black pattern layer 1304, and a stored image 100-S-n in the black pattern big database 100-S. In the illustrated embodiment, the size-adjusted black pattern layer 1304 is overlaid on the stored image 100-S-n, and the probability of match is calculated based on regions of overlap 2104. Because the black pattern layers are solid filled patterns, the regions of overlap include solid regions of overlap. In one non-limiting example, the probability of match PM can be calculated as PM=[(no. of pixels in overlap regions)/(no. pixels in the black pattern layer)]×100.

Figure 22:
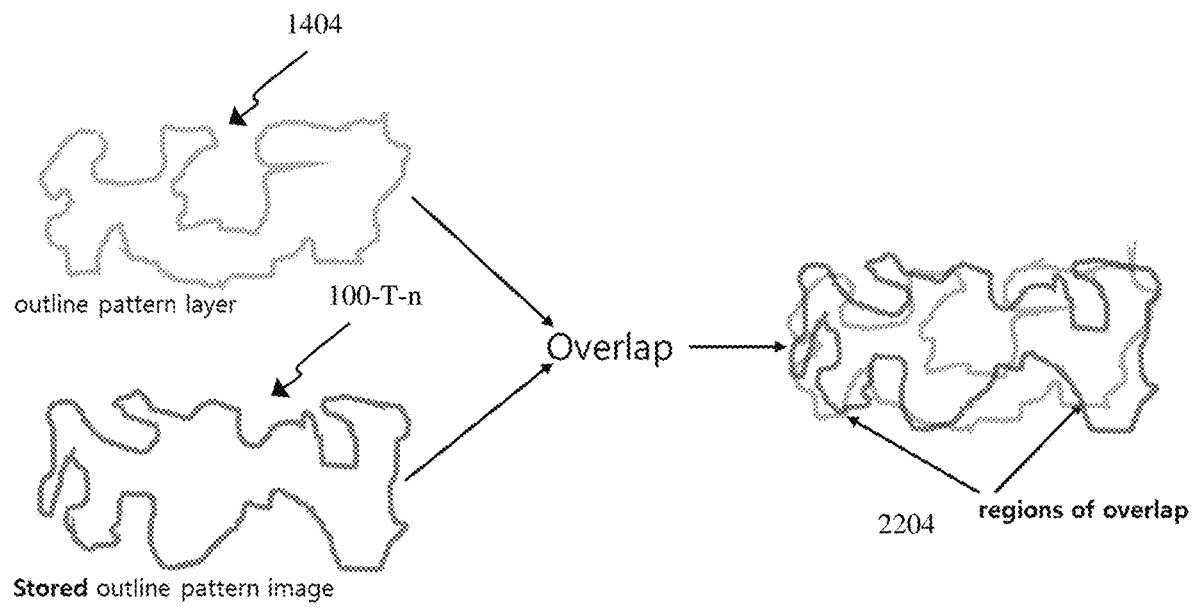
FIG. 22 illustrates comparing and determining a probability of match between an outline pattern layer and a stored image in the outline pattern big database, according to embodiments.

FIG. 22 illustrates an example process 100-N2 of comparing and determining a probability of match between an outline pattern layer, e.g., the size-adjusted outline pattern layer 1404, and a stored image 100-T-n in the outline pattern big database 100-T. In the illustrated embodiment, the size-adjusted outline pattern layer 1404 is overlaid on the stored image 100-T-n, and the probability of match is calculated based on the regions of overlap 2104. Because the outline pattern layers are line patterns, the regions of overlap include regions of intersection of the line patterns. In one non-limiting example, the probability of match PM can be calculated as PM=[(no. of pixels in overlap regions)/(no. pixels in the black pattern layer)]×100.

Figure 23:
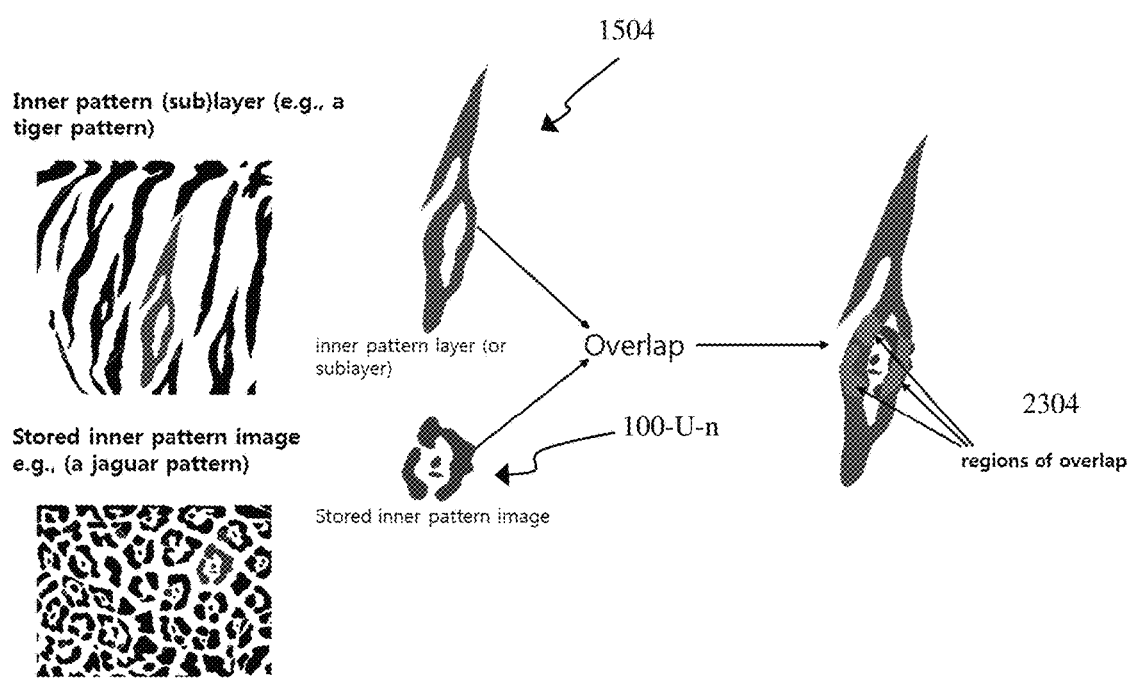
FIG. 23 illustrates comparing and determining a probability of match between an inner pattern layer and a stored image in the inner pattern big database, according to embodiments.

FIG. 23 illustrates an example process 100-N3 of comparing and determining a probability of match between an inner pattern layer, e.g., the size-adjusted inner pattern layer 1504, and a stored image 100-U-n in the inner pattern big database 100-U. In the illustrated embodiment, the size-adjusted inner pattern layer 1504 is overlaid on the stored image 100-U-n, and the probability of match is calculated based on the regions of overlap 2204. Because the outline pattern layers can include line and/or solid patterns, the regions of overlap can include solid regions of overlap and/or intersections of the line patterns. In one non-limiting example, the probability of match PM can be calculated as PM=[(no. of pixels in overlap regions)/(no. pixels in the black pattern layer)]×100.

Figure 24:
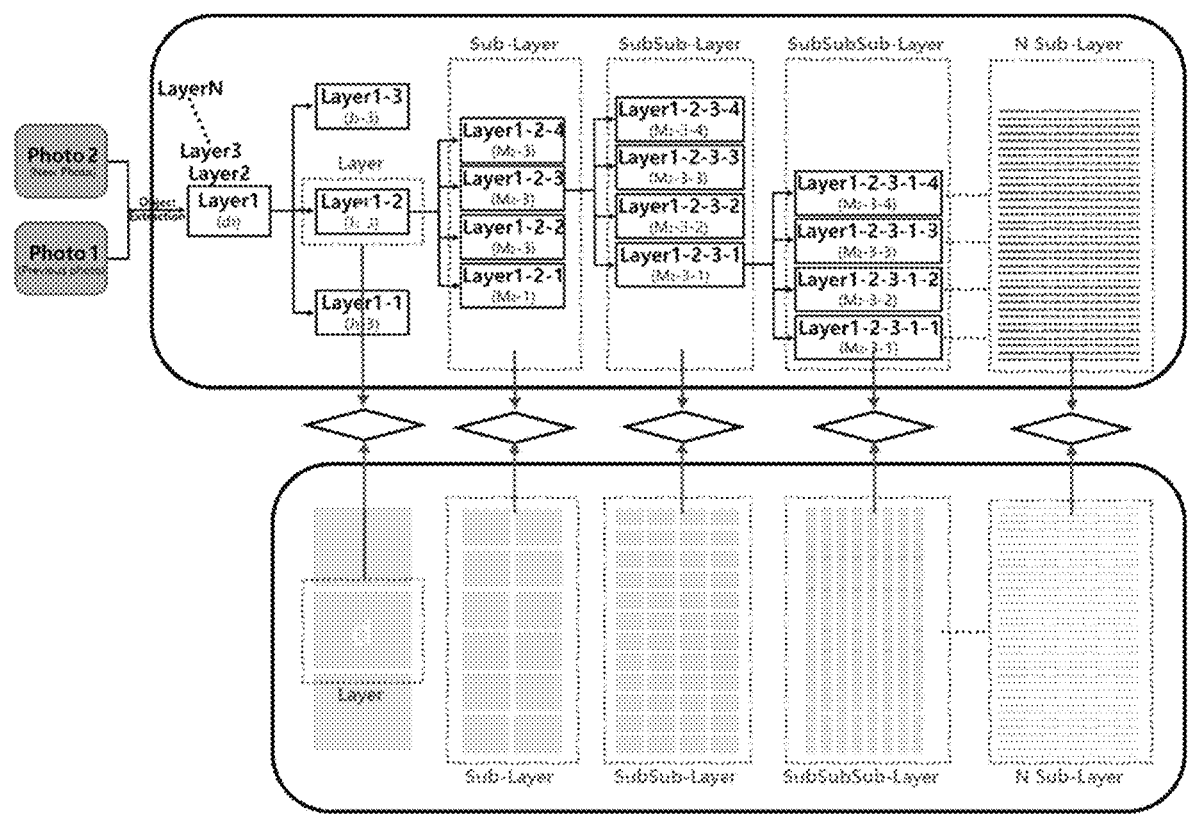
FIG. 24 illustrates comparing and determining a probability of match between a pattern layer (black pattern layer, outline pattern layer, inner pattern layer) and a stored image in a big database, (black pattern big database, outline pattern big database, inner pattern big database) using a Monte Carlo tree search method, which employs a combination of policy networks and value networks, according to embodiments.

FIG. 24 illustrates comparing and determining a probability of match between a pattern layer (black pattern layer, outline pattern layer, inner pattern layer) and a stored image in a big database, (black pattern big database, outline pattern big database, inner pattern big database) using a Monte Carlo tree search method, which employs a combination of policy networks and value networks, according to embodiments.

Figure 25:
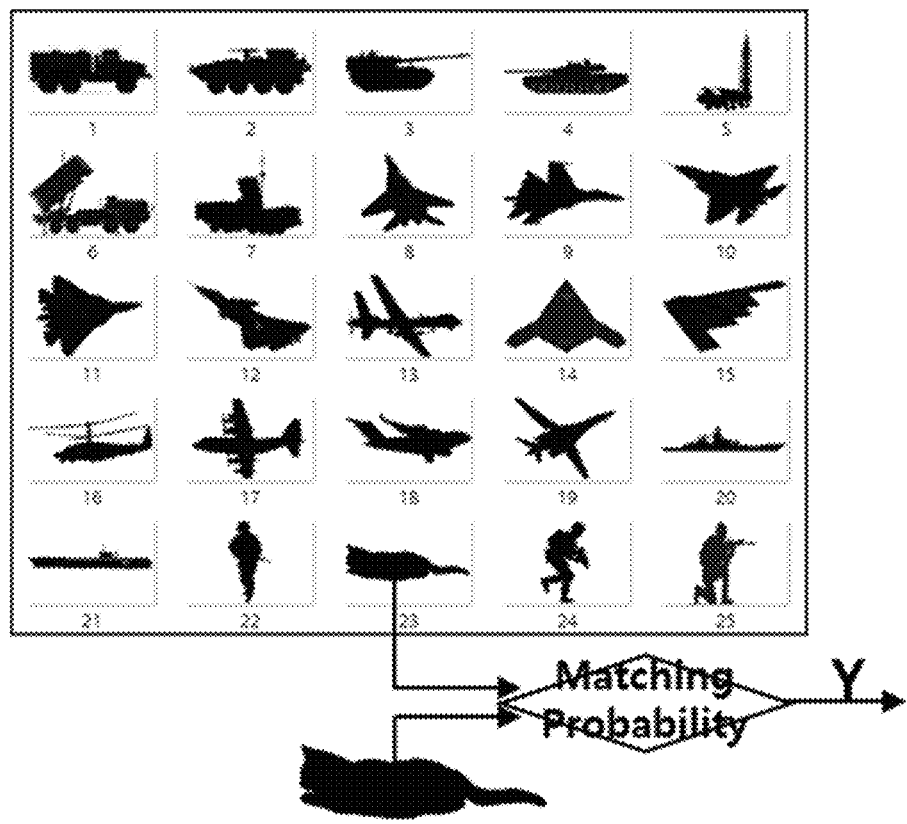
FIGS. 25-27 illustrate, when the probability of match is determined to be greater than or equal to a predetermined accuracy value, the image pattern layers are added to a respective one of the black pattern big database, the outline pattern database and the inner pattern database, according to embodiments.
Figure 26:
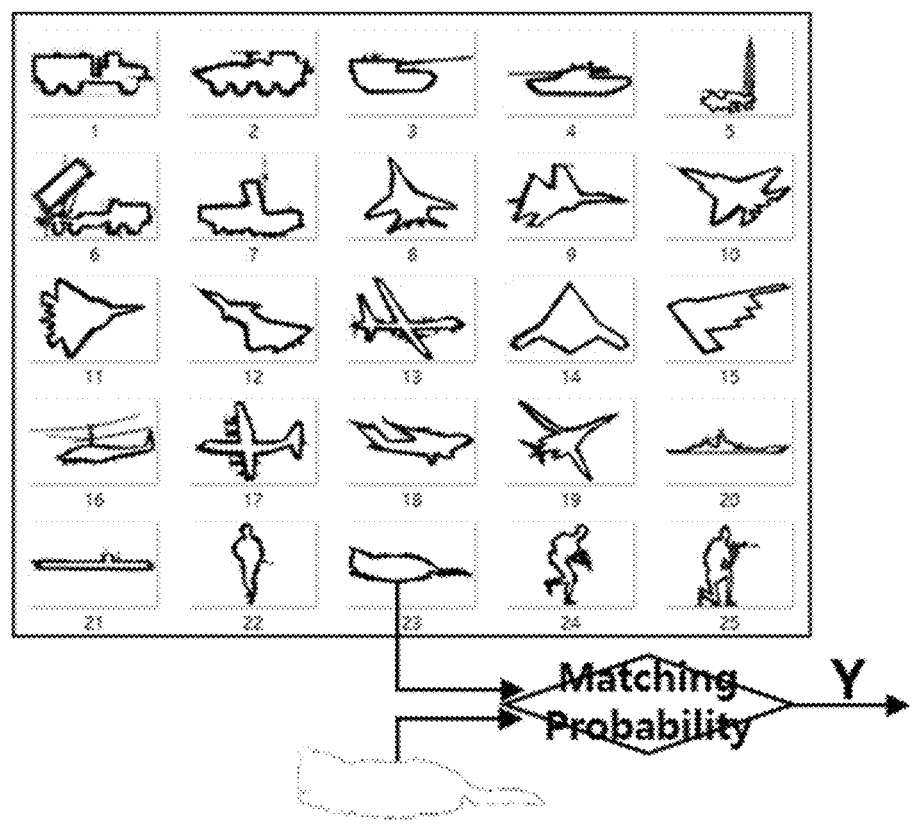
Figure 27:
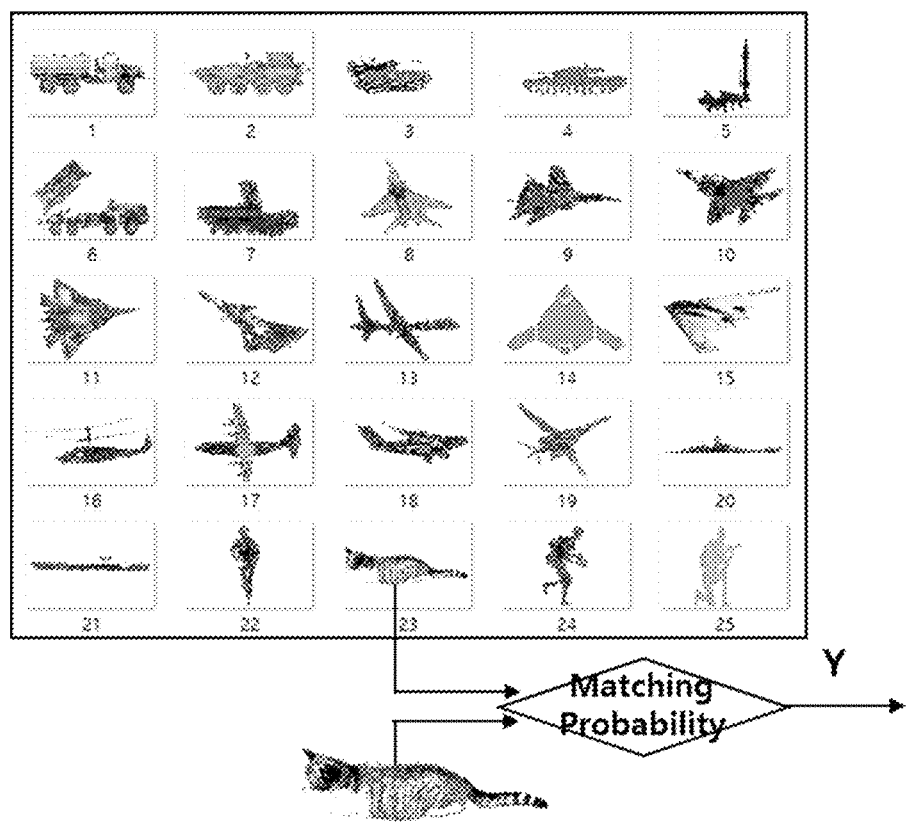

Referring to FIGS. 23-25, when the probability of match at each of the decision processes 100-N1, 100-N2, 100-N3 (FIGS. 1A, 1C) is determined to be less than the predetermined accuracy value, e.g., less than or equal to 70%, less than or equal to 80%, less than or equal to 90%, less than or equal to 95%, or less than a value within a range defined by any of these values, the one or more image pattern layers are discarded without being added to a respective one of the black pattern big database 100-S, outline pattern database 100-T and inner pattern database 100-U, and the method may end. When the probability of match at each of the decision processes 100-N1, 100-N2, 100-N3 is determined to be greater or equal to a predetermined accuracy value, e.g., greater than or equal to 70%, greater than or equal to 80%, greater than or equal to 90%, greater than or equal to 95%, or greater than a value within a range defined by any of these values, the one or more image pattern layers are added to a respective one of the black pattern big database 100-S, the outline pattern database 100-T and the inner pattern database 100-U. Thereafter, the method proceeds to a process 100-Q where the probabilities of match determined at the decision processes 100-N1, 100-N2, 100-N3 are averaged, whose value may be output, e.g., to a display device at a process 100-R.

Figure 28A:
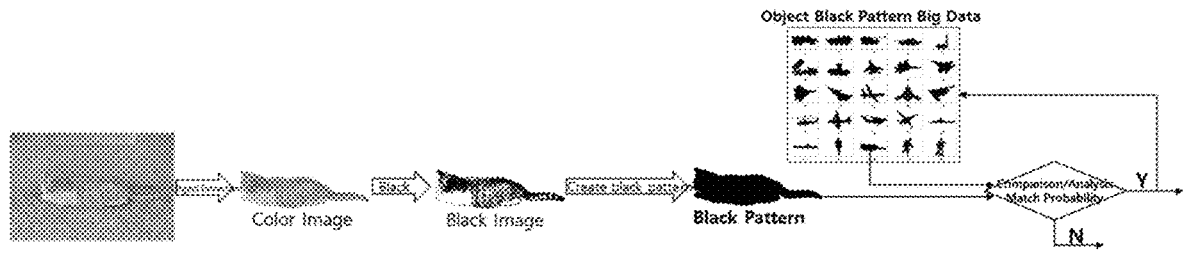
FIG. 28A illustrates a neural network when one of transformation into a black pattern layer, outline pattern layer or an inner pattern layer is performed, according to embodiments.
Figure 28B:
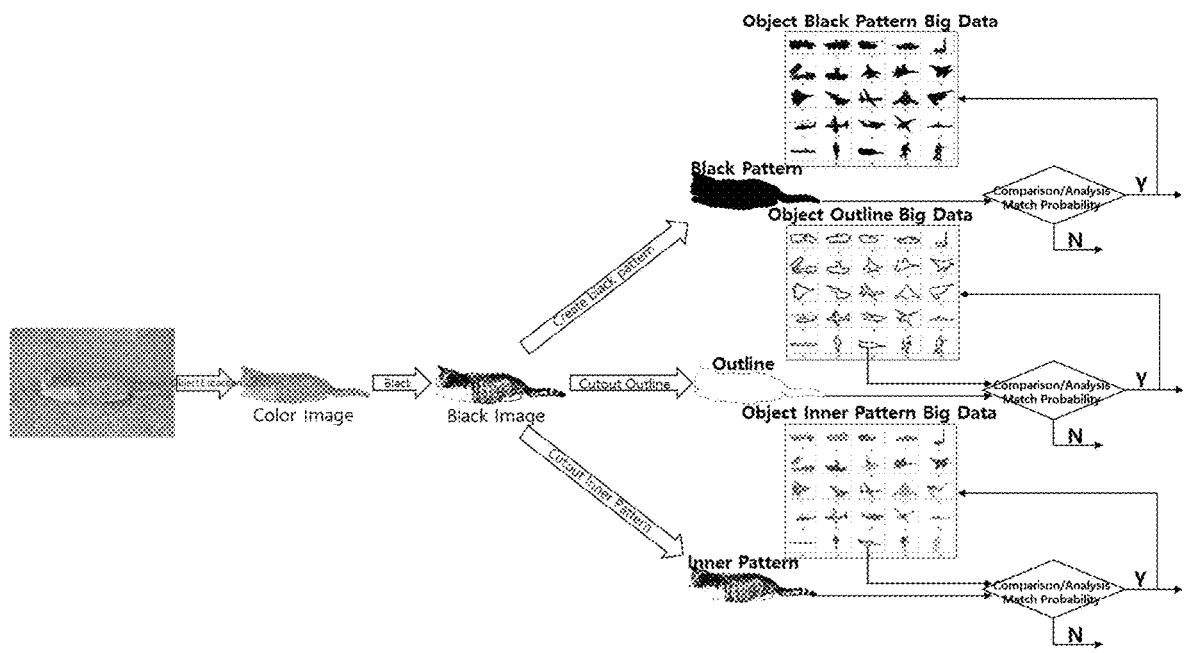
FIG. 28B illustrates a neural network when all of the transformations into a black pattern layer, outline pattern layer and an inner pattern layer are performed, according to embodiments.

Reference is now made to FIGS. 28A and 28B. FIG. 28A illustrates a neural network 100D when one of the processes 100-J-1, 100-J-2, 100-J-3 of transforming into a black pattern layer, outline pattern layer or an inner pattern layer is performed, while FIG. 28B illustrates a neural network 100E when all of the processes 100-J-1, 100-J-2, 100-J-3 of transforming into a black pattern layer, outline pattern layer and an inner pattern layer is performed. Each of neural networks 100D and 100E comprises successive layers B, D, E, F, J, K, Q and R, resulting from processes 100-B, 100-D1 through 10-D2, 100-E1 through 100-E3, 100-F, 100-J, 100-K, 100-Q and 100-R described above with respect to FIGS. 1A-1C, respectively. The neural network 100D additionally includes successive layers M-1, M-2 and N resulting from one of processes Mn-1, Mn-2 and Nn described above with respect to FIGS. 1A-1C, respectively, where n=1, 2 or 3. The neural network 100D additionally includes successive layers M-1, M-2 and N resulting from each of processes Mn-1, Mn-2 and Nn described above with respect to FIGS. 1A-1C, respectively, where n=1, 2 or 3. According to embodiments, creation of layers and sublayers having unique identifiers are automatic, as illustrated above with respect to FIG. 5B.

Figure 29:
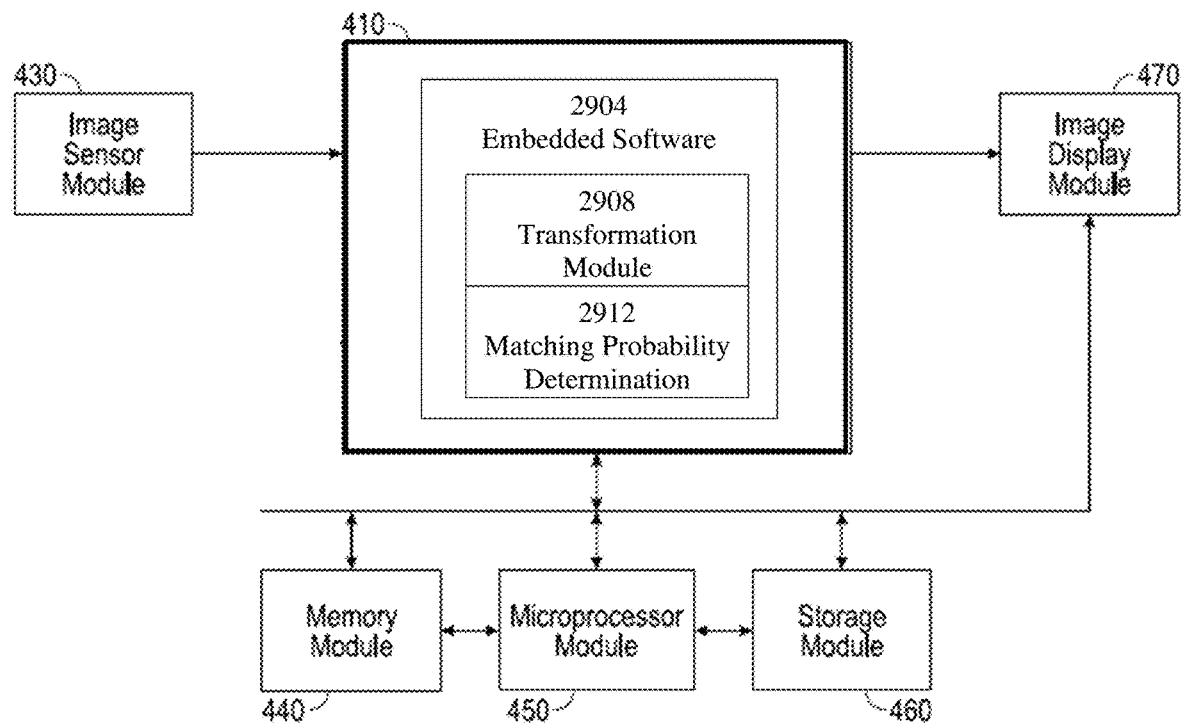
FIGS. 29-31 illustrate functional block diagrams illustrating electronic devices configured to identify a moving object in a video image using an artificial intelligence neural network configured for deep learning.
Figure 30:
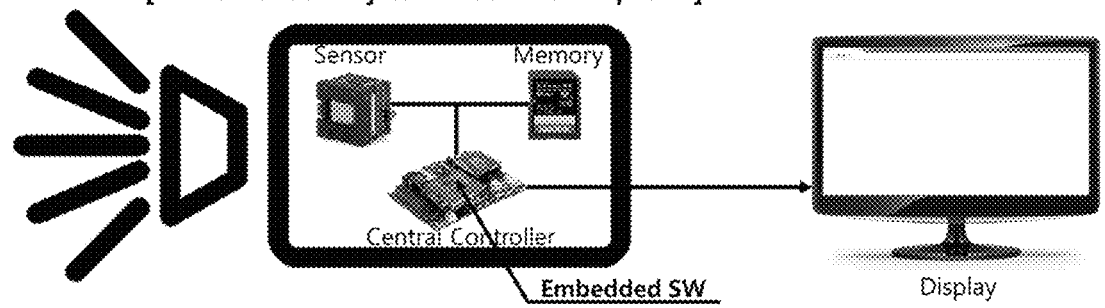
Figure 31:
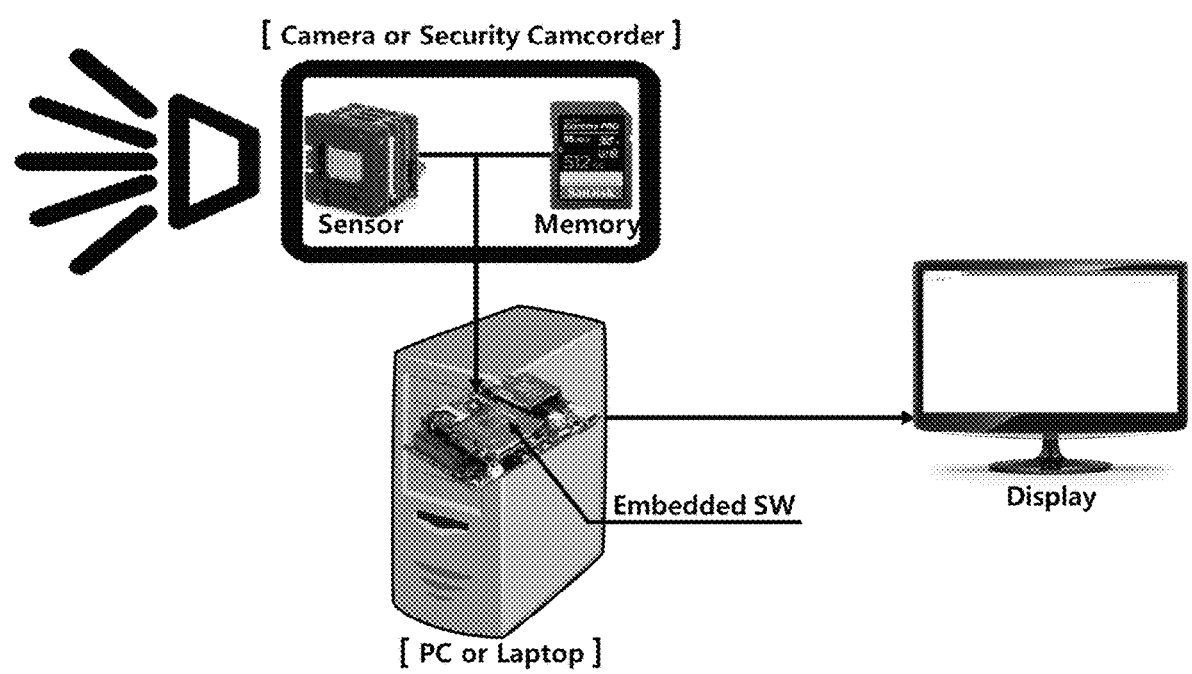

FIGS. 29-31 illustrate functional block diagrams illustrating electronic devices 2900, 3000 and 3100, respectively, configured to identify a moving object in a video image using an artificial intelligence neural network configured for deep learning. Each of the electronic devices 2900, 3000, 3100 comprises a video capturing module or an image sensor module 430 configured to capture a video input from a scene comprising one or more candidate moving objects using a video image-capturing device, where the video input comprising at least two temporally spaced image frames captured from the scene. The electronic device additionally comprises an embedded software 2904. The electronic device additionally includes a big data library comprising a plurality of stored images, wherein the embedded software is configured to add one or more image pattern layers having the probability of match that exceeds a predetermined level to the big data library automatically. The electronic device further comprises an output device configured to output the probability of match to a user. In some embodiments, the embedded software can be included as part of a central controller (FIG. 30) in the electronic device 3000 that includes the image sensor module 430 and/or memory module 440 and/or the storage module 460 that includes the big data library described above. In some other embodiments, the embedded software can be included as part of a central controller (FIG. 31) in the electronic device 3200 that does not include the image sensor module 430 and/or memory module 440 and/or the storage module 460 that includes the big data library described above.

The embedded software 2904 of the electronic devices 2900, 3000, 3100 is communicatively coupled to a memory module 440, a microprocessor module 450 and a storage module 460. The memory module 440, the microprocessor module 450 and the storage module 460 are communicatively connected to each other through, for example, a bus.

The image sensing module 430 is configured to absorb photons reflected from objects and convert them into electrical signals for processing, prior to being displayed or stored. The image sensing module 430 comprises an image sensor comprising a plurality of pixels. Each pixel of the image sensor comprises a plurality of photosensitive area, e.g., a photodiode, which is configured to absorb incident photons of light. In some embodiments, incident photons may be directed by a micro lens over each pixel to enhance the quantum efficiency of photon collection. The absorbed photons are converted into electrons, whose number may depend on the energy of the incident photon. The electrons are in turn converted to a voltage signal.

In some embodiments, the image sensing module 430 includes a charge-coupled device (CCD) image sensor. A CCD image sensor comprises a color filter array and a pixel array. Each pixel of a CCD image sensor includes a color filter comprising a pattern of red, green and blue filters. The filtered photons passing through different color filters are absorbed by a photodiode within the pixel array. The photodiode converts the absorbed photons into a charge, and the charge is moved to a single location by applying different voltages to pixels, in a process called charge-coupling. Because the charge in the pixel is moved by applying different voltages, CCD image sensors are supported by external voltage generators.

In some embodiments, the image sensing module 430 includes a complementary metal oxide semiconductor (CMOS) image sensor Like CCD image sensors, CMOS image sensors include an array of photo-sensitive diodes, one diode within each pixel. Unlike CCDs, however, each pixel in a CMOS imager has its own individual integrated amplifier. In addition, each pixel in a CMOS imager can be read directly in an x-y coordinate system, rather than through movement of a charge. Thus, a CMOS image sensor pixel detects a photon directly and converts it to a voltage, which is outputted.

In some implementations, the image sensing module 430 includes additional circuitry for converting the outputted voltages resulting from an incident photon into digital information. In addition, the image sensing module 430 can further includes an image sensor controller configured to control the image sensor in response to various commands and exposure parameters received from the background-guided metering unit 410.

The embedded software 2904 comprises a transformation module 2908 configured to transform the video input into one or more image pattern layers, wherein each of the image pattern layers comprises a pattern representing one of the candidate moving objects, and a matching probability determination module 2912 configured to determine a probability of match between each of the image pattern layers and a stored image in a big data library.

The image display module 470 may be configured to output the probability of match "real time" under an imaging mode of the electronic devices 2900, 3000, 3100. The probability of match may be displayed, for example, before and after each frame is generated by the image sensing module 430. The display module 470 may be further configured to display the probability of match "off line" while not in an imaging mode, under which the output may be retrieved from the memory module 440 or the storage module 460.

The image display module 470 includes a display device and a display controller. In one embodiment, the display device can include an active matrix organic light-emitting diode (AMOLED) display comprising an active matrix of organic light-emitting diode (OLED) pixels that generate light upon electrical activation. The OLED pixels can be integrated onto a thin film transistor (TFT) array, which functions as a series of switches to control the current flowing to each individual pixel. Other embodiments of the display device are possible, including an LED, LCD, OLED, AMOLED, or any other similar types of displays that can be configured as display device for the digital image apparatus 400.

The digital imaging apparatus 400 further includes the memory module 440 configured to store information including the big data libraries described above while the digital imaging apparatus 400 is powered on. The memory module 440 can be configured to hold information such as fully or partially processed pixel information associated with the image frames at various stages of the operation of the background-guided metering module 410. The memory module 440 can include memory devices such as a static random access memory (SRAM) and a dynamic random access memory (RAM). The memory devices can be configured as different levels of cache memory communicatively coupled to the microprocessor module 450 through a memory bus that provides a data path for flow of data to and from the memory devices and the microprocessor module 450.

The digital imaging apparatus 400 further includes the storage module 470 configured to store the big data libraries described above as well as other media such as photo and video files, and software codes. In some embodiments, the storage module 470 is configured to permanently store media even when the digital imaging apparatus 400 is powered off. In some implementations, the storage module 270 includes storage media, such as a hard disk, a nonvolatile memory such as flash memory, read-only memory (ROM), among others.

Computer Vision to Detect Objects in Ambient Environment

As discussed above, identification of moving objects in a video image may be accomplished using a variety of techniques, including various environmental sensors (e.g., cameras, audio sensors, temperature sensors, etc.), as discussed herein.

In some embodiments, identification of moving objects in a video image may be accomplished using computer vision techniques. For example, as disclosed herein, the display system's forward-facing camera may be configured to image the ambient environment and the display system may be configured to perform image analysis on the images to determine the presence of objects in the ambient environment. The display system may analyze the images acquired by the outward-facing imaging system to perform scene reconstruction, event detection, video tracking, object recognition, object pose estimation, learning, indexing, motion estimation, or image restoration, etc. As other examples, the display system may be configured to perform face and/or eye recognition to determine the presence and location of faces and/or human eyes in the user's field of view. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-S chunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

One or more of these computer vision techniques may also be used together with data acquired from other environmental sensors (such as, e.g., microphone) to detect and determine various properties of the objects detected by the sensors.

As discussed herein, the objects in the ambient environment may be detected based on one or more criteria. When the display system detects the presence or absence of the criteria in the ambient environment using a computer vision algorithm or using data received from one or more sensor assemblies (which may or may not be part of the display system), the display system may then signal the presence of the object.

Machine Learning

A variety of machine learning algorithms may be used to learn to identify of moving objects in a video image. Once trained, the machine learning algorithms may be stored by the display system. Some examples of machine learning algorithms may include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models may be customized for individual data sets. For example, the wearable device may generate or store a base model. The base model may be used as a starting point to generate additional models specific to a data type (e.g., a particular user), a data set (e.g., a set of additional images obtained), conditional situations, or other variations. In some embodiments, the display system may be configured to utilize a plurality of techniques to generate models for analysis of the aggregated data. Other techniques may include using predefined thresholds or data values.

The criteria for detecting an object may include one or more threshold conditions. If the analysis of the data acquired by the environmental sensor indicates that a threshold condition is passed, the display system may provide a signal indicating the detection the presence of the object in the ambient environment. The threshold condition may involve a quantitative and/or qualitative measure. For example, the threshold condition may include a score or a percentage associated with the likelihood of the reflection and/or object being present in the environment. The display system may compare the score calculated from the environmental sensor's data with the threshold score. If the score is higher than the threshold level, the display system may detect the presence of the reflection and/or object. In some other embodiments, the display system may signal the presence of the object in the environment if the score is lower than the threshold. In some embodiments, the threshold condition may be determined based on the user's emotional state and/or the user's interactions with the ambient environment.

In some embodiments, the threshold conditions, the machine learning algorithms, or the computer vision algorithms may be specialized for a specific context. For example, in a diagnostic context, the computer vision algorithm may be specialized to detect certain responses to the stimulus. As another example, the display system may execute facial recognition algorithms and/or event tracing algorithms to sense the user's reaction to a stimulus, as discussed herein.

It will be appreciated that each of the processes, methods, and algorithms described herein and/or depicted in the figures may be embodied in, and fully or partially automated by, code modules executed by one or more physical computing systems, hardware computer processors, application-specific circuitry, and/or electronic hardware configured to execute specific and particular computer instructions. For example, computing systems may include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some embodiments, particular operations and methods may be performed by circuitry that is specific to a given function.

Further, certain embodiments of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. In some embodiments, the non-transitory computer-readable medium may be part of one or more of the local processing and data module, the remote processing module, and remote data repository. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities may be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto may be performed in other sequences that are appropriate, for example, in serial, in parallel, or in some other manner. Tasks or events may be added to or removed from the disclosed example embodiments. Moreover, the separation of various system components in the embodiments described herein is for illustrative purposes and should not be understood as requiring such separation in all embodiments. It should be understood that the described program components, methods, and systems may generally be integrated together in a single computer product or packaged into multiple computer products.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Accordingly, the claims are not intended to be limited to the embodiments shown herein, but are to be accorded the widest scope consistent with this disclosure, the principles and the novel features disclosed herein.

What is claimed is:

1. A method implemented on an electronic device for identifying a moving object in a video image using an artificial intelligence neural network configured for deep learning, the method comprising:
    capturing a video input from a scene comprising one or more candidate moving objects using a video image-capturing device, the video input comprising at least two temporally spaced image frames captured from the scene;
    transforming the video input into one or more image pattern layers, wherein each of the image pattern layers comprises a pattern representing one of the candidate moving objects;
    determining a probability of match between each of the image pattern layers and a stored image in a big data library;
    adding one or more image pattern layers having the probability of match that exceeds a predetermined level to the big data library automatically; and
    outputting the probability of match.

2. The method of claim 1, wherein transforming into one or more image pattern layers comprises transforming into one or more of:
    a black pattern layer comprising a solid-filled pattern representing the one or the one or more candidate moving objects;
    an outline pattern layer comprising a contiguous outer outline representing the one or more candidate moving objects; and
    an inner pattern layer comprising patterns inside an outer outline representing the one or more candidate moving objects.

3. The method of claim 2, wherein transforming into one or more image pattern layers comprises reducing the size of the video input by at least three orders of magnitude.

4. The method of claim 3, wherein each of the image pattern layers and the stored image in the big data library do not exceed about 1 kilobytes and is formed of a plurality of 1 bit pixels.

5. The method of claim 3, wherein the method is performed in a single integrated device without communicating with an external processor, an external memory device or an external storage device.

6. The method of claim 3, wherein determining the probability of match comprises calculating a degree of overlap between each of the image pattern layers and a stored image in the big data library.

7. The method of claim 3, wherein the method is a deep learning method in which each of transforming the video input, determining the probability of match, and adding one or more image pattern layers to the big data library is performed automatically without intervention by a user.

8. An electronic device configured to identify a moving object in a video image using an artificial intelligence neural network configured for deep learning, comprising:
   a video capturing module configured to capture a video input from a scene comprising one or more candidate moving objects using a video image-capturing device, the video input comprising at least two temporally spaced image frames captured from the scene;
   an embedded software comprising: a transformation module configured to transform the video input into one or more image pattern layers, wherein each of the image pattern layers comprises a pattern representing one of the candidate moving objects, and a matching probability determination module configured to determine a probability of match between each of the image pattern layers and a stored image in a big data library;
   a big data library comprising a plurality of stored images, wherein the embedded software is configured to add one or more image pattern layers having the probability of match that exceeds a predetermined level to the big data library automatically; and
   an output device configured to output the probability of match.

9. The electronic device of claim 8, wherein the transforming module is configured to transform into one or more image pattern layers comprises transforming into one or more of:
   a black pattern layer comprising a solid-filled pattern representing the one or the one or more candidate moving objects;
   an outline pattern layer comprising a contiguous outer outline representing the one or more candidate moving objects; and
   an inner pattern layer comprising patterns inside an outer outline representing the one or more candidate moving objects.

10. The electronic device of claim 9, wherein the transforming module is configured to reduce the size of the video input by at least three orders of magnitude.

11. The electronic device of claim 9, wherein the electronic device is configured to identify the moving object as a single integrated device without communicating with an external processor, an external memory device or an external storage device.

12. The electronic device of claim 9, wherein the matching probability determination module is configured to calculate a degree of overlap between each of the image pattern layers and a stored image in the big data library.

13. The electronic device of claim 9, wherein the artificial intelligence neural network is configured for deep learning in which each of transforming the video input, determining the probability of match, and adding one or more image pattern layers to the big data library is performed automatically without intervention by a user.

14. A non-transitory computer-readable medium comprising instructions that when executed cause a processor to perform the following steps for identifying a moving object in a video image using an artificial intelligence neural network configured for deep learning:
   capturing a video input from a scene comprising one or more candidate moving objects using a video image-capturing device, the video input comprising at least two temporally spaced image frames captured from the scene;
   transforming the video input into one or more image pattern layers, wherein each of the image pattern layers comprises a pattern representing one of the candidate moving objects;
   determining a probability of match between each of the image pattern layers and a stored image in a big data library; adding one or more image pattern layers having the probability of match that exceeds a predetermined level to the big data library automatically; and
   outputting the probability of match.

15. The non-transitory computer-readable medium of claim 14, wherein transforming into one or more image pattern layers comprises transforming into one or more of:
   a black pattern layer comprising a solid-filled pattern representing the one or the one or more candidate moving objects;
   an outline pattern layer comprising a contiguous outer outline representing the one or more candidate moving objects; and
   an inner pattern layer comprising patterns inside an outer outline representing the one or more candidate moving objects.

16. The non-transitory computer-readable medium of claim 15, wherein transforming into one or more image pattern layers comprises reducing the size of the video input by at least three orders of magnitude.

17. The non-transitory computer-readable medium of claim 16, wherein each of the image pattern layers and the stored image in the big data library do not exceed about 1 kilobytes and is formed of a plurality of 1 bit pixels.

18. The non-transitory computer-readable medium of claim 16, wherein the method is performed in a single integrated device without communicating with an external processor, an external memory device or an external storage device.

19. The non-transitory computer-readable medium of claim 16, wherein determining the probability of match comprises calculating a degree of overlap between each of the image pattern layers and a stored image in the big data library.

20. The non-transitory computer-readable medium of claim 16, wherein the artificial intelligence neural network is configured for deep learning in which each of transforming the video input, determining the probability of match, and adding one or more image pattern layers to the big data library is performed automatically without intervention by a user.

21. A method of identifying a moving object in one or more image frames of a video image using an artificial intelligence neural network configured for deep learning, the method comprising:
- receiving an input image data from a video image-capturing device, the input image data comprising at least two image frames captured from a scene;
- identifying one or more candidate moving objects in the scene based on whether a change in RGB values has occurred in pixels associated with the one or more candidate moving objects between two of the at least two image frames;
- creating a plurality of image layers corresponding to each of the at least two image frames having the one or more identified candidate moving objects, wherein each of the image layers comprises an extracted image portion which includes the pixels associated with the one or more candidate moving objects;
- creating a set of noise-filtered image layers from the plurality of image layers, wherein each noise-filtered image layer of the set of noise-filtered image layers includes one or more moving candidate having greater than a predetermined minimum number of pixels;
- transforming the set of noise-filtered image layers into a set of gray scale image layers;
- transforming each image layer of the set of gray scale image layers into one or more image pattern layers, wherein each of the one or more image pattern layers comprises a pattern representing one of the one or more candidate moving objects;
- determining a probability of match between pixels of each of the one or more image pattern layers and pixels of a stored image, wherein the stored image is one of a plurality of stored images in a big data library; and
- adding one or more image pattern layers having the probability of match that exceeds a predetermined level of match to the big data library; and outputting the probability of match to a user.

22. The method of claim 21, wherein transforming into one or more image pattern layers comprises transforming into one or more of: a black pattern layer comprising a solid-filled pattern representing the one or the one or more candidate moving objects; an outline pattern layer comprising a contiguous outer outline representing the one or more candidate moving objects; and an inner pattern layer comprising patterns inside an outer outline representing the one or more candidate moving objects.

23. The method of claim 21, wherein the method is a deep learning method in which creating the plurality of image layers, creating the set of noise-filtered image layers, transforming a set of noise-filtered image layers into the set of gray scale image layers, transforming each image layer of the set of gray scale image layers into one or more image pattern layers, determining a probability of match, and adding one or more image pattern layers to the big data library is performed automatically without intervention by the user.

* * * * *

UNITED STATES PATENT AND TRADEMARK OFFICE
CERTIFICATE OF CORRECTION

PATENT NO. : 10,726,307 B2  
APPLICATION NO. : 16/024433  
DATED : July 28, 2020  
INVENTOR(S) : Changwoo Cho Page 1 of 2

It is certified that error appears in the above-identified patent and that said Letters Patent is hereby corrected as shown below:

In the Drawings

In sheet 19 of 27, FIG. 21, Line 6 approx., delete "patter" and insert --pattern--.

In the Specification

In Column 2, Line 63, delete "gray scale" and insert --grayscale--.

In Column 2, Line 64, delete "gray scale" and insert --grayscale--.

In Column 3, Line 54, delete "gray scale" and insert --grayscale--.

In Column 6, Line 13, delete "gray scale" and insert --grayscale--.

In Column 6, Line 18, delete "gray scale" and insert --grayscale--.

In Column 10, Lines 5-6, delete "1-2-3-1-1-," and insert --1-2-3-1-1,--.

In Column 11, Line 13, delete "object9s)" and insert --object(s)--.

In Column 11, Line 17, delete "gray scale" and insert --grayscale--.

In Column 11, Line 19, delete "gray scale" and insert --grayscale--.

In Column 11, Line 21, delete "gray scale" and insert --grayscale--.

In Column 11, Line 31, delete "gray scale" and insert --grayscale--.

In Column 11, Line 39, delete "gray scale" and insert --grayscale--.

Signed and Sealed this  
Tenth Day of November, 2020

Andrei Iancu  
*Director of the United States Patent and Trademark Office*

CERTIFICATE OF CORRECTION (continued)
U.S. Pat. No. 10,726,307 B2

In Column 11, Lines 46-47, delete "gray scale" and insert --grayscale--.

In Column 11, Lines 54-55, delete "gray scale" and insert --grayscale--.

In Column 12, Line 18 approx., delete "patter" and insert --pattern--.

In Column 12, Line 32, delete "patter" and insert --pattern--.

In Column 12, Lines 40-41, delete "gray scale" and insert --grayscale--.

In Column 17, Line 26, delete "sensor" and insert --sensor.--.

In Column 18, Line 17, delete "(RAM)." and insert --(DRAM).--.

In Column 18, Lines 30-31, delete "nonvolatile" and insert --non-volatile--.

In the Claims

In Column 25, Line 24, Claim 21, delete "gray scale" and insert --grayscale--.

In Column 25, Line 25, Claim 21, delete "gray scale" and insert --grayscale--.

In Column 26, Line 23, Claim 23, delete "gray scale" and insert --grayscale--.

In Column 26, Line 24, Claim 23, delete "gray scale" and insert --grayscale--.